(12) United States Patent
Katsuo et al.

(10) Patent No.: US 8,229,273 B2
(45) Date of Patent: Jul. 24, 2012

(54) RECORDING-AND-REPRODUCING APPARATUS AND RECORDING-AND-REPRODUCING METHOD

(75) Inventors: Satoshi Katsuo, Tokyo (JP); Minoru Kawahara, Kanagawa (JP); Hisao Tanaka, Tokyo (JP); Noboru Oya, Kanagawa (JP); Tetsuya Narita, Tokyo (JP); Yuka Yamamoto, Tokyo (JP)

(73) Assignee: Sony Corporation (JP)

( * ) Notice: Subject to any disclaimer, the term of this patent is extended or adjusted under 35 U.S.C. 154(b) by 1318 days.

(21) Appl. No.: 11/904,286

(22) Filed: Sep. 26, 2007

(65) Prior Publication Data
US 2008/0080842 A1 Apr. 3, 2008

(30) Foreign Application Priority Data

Sep. 29, 2006 (JP) ................ P2006-269891

(51) Int. Cl.
*H04N 5/77* (2006.01)
*H04N 9/88* (2006.01)
*H04N 5/93* (2006.01)
*G11B 27/00* (2006.01)
*H04N 9/885* (2006.01)
*H04N 5/76* (2006.01)

(52) U.S. Cl. ........ 386/224; 386/225; 386/263; 386/267; 386/278; 386/286; 386/291; 386/292; 386/294; 386/295

(58) Field of Classification Search ............ 386/224, 386/225, 263, 267, 278, 286, 291, 292, 294, 386/295
See application file for complete search history.

(56) References Cited

U.S. PATENT DOCUMENTS

| 4,980,818 | A | 12/1990 | Shinmura |
| 7,206,973 | B2 | 4/2007 | Daftardar |
| 7,236,684 | B2 * | 6/2007 | Kawakami et al. ......... 386/278 |
| 7,383,446 | B1 | 6/2008 | Hatanaka et al. |
| 7,869,697 | B2 * | 1/2011 | Nagaoka et al. ......... 386/248 |
| 2002/0073110 | A1 | 6/2002 | Duvillier et al. |

(Continued)

FOREIGN PATENT DOCUMENTS

EP 0 978 994 2/2000

(Continued)

OTHER PUBLICATIONS

Office Action from Japanese Application No. 2006-269891, dated Jun. 21, 2011.

(Continued)

*Primary Examiner* — Daquan Zhao
(74) *Attorney, Agent, or Firm* — Lerner, David, Littenberg, Krumholz & Mentlik, LLP

(57) ABSTRACT

A recording-and-reproducing apparatus for reproducibly controlling data recorded on a recording medium includes: a device configured to acquire control information required for reproducing the data when the data is recorded; a device configured to control operations during the period from the start to the end of recording data on the recording medium. The apparatus further includes a device configured to determine whether a recorded file of the data exceeds a predetermined limit of a storage capacity of a file system in the recoding medium and sequentially generate a subsequent recorded file upon exceeding the limit. Moreover, the apparatus includes a device configured to generate a single recording-and-reproducing unit during the period on the recording medium indicated by the control device based on a plurality of recorded files upon exceeding the limit; and a device configured to update the control information by recording the single recording-and-reproducing unit on the control information.

7 Claims, 11 Drawing Sheets

U.S. PATENT DOCUMENTS

| | | |
|---|---|---|
| 2003/0028553 A1 | 2/2003 | Kondo |
| 2003/0142954 A1 | 7/2003 | Kotani et al. |
| 2003/0210898 A1 | 11/2003 | Juen et al. |
| 2004/0056087 A1 | 3/2004 | Bonneau et al. |
| 2004/0172575 A1 | 9/2004 | Lo et al. |
| 2004/0184775 A1 | 9/2004 | Nakamura et al. |
| 2005/0114438 A1 | 5/2005 | Bendich et al. |
| 2005/0122863 A1 | 6/2005 | Kudo |
| 2005/0149579 A1 | 7/2005 | Tsubaki et al. |
| 2005/0237865 A1 | 10/2005 | Ando et al. |
| 2005/0286377 A1 | 12/2005 | Fontijn |
| 2006/0013085 A1 | 1/2006 | Kelly et al. |
| 2006/0051056 A1 | 3/2006 | Furukawa et al. |
| 2006/0112124 A1* | 5/2006 | Ando et al. ................ 707/101 |
| 2006/0126451 A1 | 6/2006 | Shinkai et al. |
| 2006/0195486 A1 | 8/2006 | Ohno et al. |
| 2006/0265426 A1* | 11/2006 | Chen ............................ 707/200 |
| 2007/0143328 A1 | 6/2007 | Green et al. |
| 2007/0255727 A1 | 11/2007 | Hirose |
| 2008/0063387 A1 | 3/2008 | Yahata et al. |

FOREIGN PATENT DOCUMENTS

| | | |
|---|---|---|
| EP | 1632947 | 3/2006 |
| EP | 1653466 | 5/2006 |
| JP | 11-341434 A | 12/1999 |
| JP | 2000-021086 A | 1/2000 |
| JP | 2003-052040 A | 2/2003 |
| JP | 2003-061041 A | 2/2003 |
| JP | 2003217266 A | 7/2003 |
| JP | 2004-127426 A | 4/2004 |
| JP | 2004-328034 A | 11/2004 |
| JP | 2004-328073 A | 11/2004 |
| JP | 2005-004850 A | 1/2005 |
| JP | 2005-005915 A | 1/2005 |
| JP | 2005-236950 A | 9/2005 |
| JP | 2005-309503 A | 11/2005 |
| JP | 2005-309504 A | 11/2005 |
| JP | 2006-107580 A | 4/2006 |
| JP | 2006-127560 A | 5/2006 |
| WO | 00/28544 | 5/2000 |
| WO | 2004042724 | 5/2004 |
| WO | 2006/033279 A1 | 3/2006 |
| WO | 2006030767 A1 | 3/2006 |

OTHER PUBLICATIONS

U.S. Appl. No. 11/897,546.
"Synchronized Multimedia Integration Language (SMIL) 1.0 Specification" Internet Citation, Jun. 15, 1998, HTTP://WWW.W3.ORG/TR/REC-SMIL>.
U.S. Appl. No. 11/880,793.
U.S. Appl. No. 11/906,064.
Communication from European Application 07253863, mailed Sep. 25, 2009.

* cited by examiner

FIG. 8

```
1:  <?xml version="1.0" encoding="UTF-8"?>
2:  <MediaProfile xmlns="http://xmlns.sony.net/pro/metadata/mediaprofile" createdAt=
3:  "2006-12-01T14:43:30+09:00" version="1.00">
4:
5:   <Contents>
6:
7:    <Material uri="/CLPR/200709_0001_01/200709_0001_01.SMI"
8:        videoType="MPEG2HD35_1920_1080_MP@HL" audioType="LPCM16"
9:   fps="59.94i" dur="1800" ch="2" aspectRatio="16:9" offset="0"
10:       umid="060A2B3401010501010D4313...13360597080046FFFF21D90E">
11:     <Component uri="/CLPR/200709_0001_01/200709_0001_01.MP4" type="MP4"
12:        videoType="MPEG2HD35_1920_1080_MP@HL" audioType="LPCM16"
13:  fps="59.94i" dur="1800" ch="2" aspectRatio="16:9" offset="0"
14:       umid="060A2B3401010501010D4313...13360597080046FFFF21D90E"/>
15:     <RelevantInfo uri="/CLPR/200709_0001_01/200709_0001_01M01.XML" type="XML"/>
16:     <RelevantInfo uri="/CLPR/200709_0001_01/200709_0001_01R01.BIM" type="BiM"/>
17:     <RelevantInfo uri="/CLPR/200709_0001_01/200709_0001_01I01.PPN" type="PPN"/>
18:    </Material>
19:
20:    <Material uri="/CLPR/200709_0001_02/200709_0001_02.SMI"
21:       videoType="MPEG2HD35_1920_1080_MP@HL" audioType="LPCM16"
22:   fps="59.94i" dur="1800" ch="2" aspectRatio="16:9" offset="0"
23:       umid="060A2B3401010501010D4313...13360597080046FFFF21D90E">
24:     <Component uri="/CLPR/200709_0001_02/200709_0001_02.MP4" type="MP4"
25:        videoType="MPEG2HD35_1920_1080_MP@HL" audioType="LPCM16"
26:  fps="59.94i" dur="1800" ch="2" aspectRatio="16:9" offset="0"
27:       umid="060A2B3401010501010D4313...13360597080046FFFF21D90E"/>
28:     <RelevantInfo uri="/CLPR/200709_0001_02/200709_0001_02M01.XML" type="XML"/>
29:     <RelevantInfo uri="/CLPR/200709_0001_02/200709_0001_02R01.BIM" type="BiM"/>
30:     <RelevantInfo uri="/CLPR/200709_0001_02/200709_0001_02I01.PPN" type="PPN"/>
31:    </Material>
32:
33:    <Material uri="/TAKR/200709_0001/200709_0001.SMI"
34:       umid="060A2B3401010501010D4313...13360597080046FFFF21D90E">
35:     <RelevantInfo uri="TAKR/200709_0001/200709_0001M01.XML" type="XML"
36:       umid="060A2B3401010501010D4313...13360597080046FFFF21D90E"/>
37:     <Component uri="/CLPR/200709_0001_01/200709_0001_01.SMI" type="XML"
38:       umid="060A2B3401010501010D4313...13360597080046FFFF21D90E"/>
39:     <Component uri="/CLPR/200709_0001_02/200709_0001_02.SMI" type="XML"
40:       umid="060A2B3401010501010D4313...13360597080046FFFF21D90E"/>
41:    </Material>
42:
43:   </Contents>
44:  </MediaProfile>
```

```
1:  <?xml version="1.0" encoding="UTF-8"?>
2:  <smil xmlns="urn:schemas-$C:edl:takeInfo"
3:  umid=" 060A2B340101010501010D431300000064F5000013360597080046FFFF21D90E"
4:  xmlns:xsi="http://www.w3.org/2001/XMLSchema-instance"
5:  xsi:schemaLocation="urn:schemas-$C:edl:takeInfo
6:  edl_takeInfo.xsd">
7:  <body>
8:  <par>
9:  <!-- Clip1 -->
10: <ref src="urn:smpte:umid:
11: 060A2B340101010501010D4313000000000000013360597080046FFFF21D90E"
12: <!-- Clip2 -->
13: <ref src="urn:smpte:umid:
14: 060A2B340101010501010D43130000005A69000013360597080046FFFF21D90E"
15: </par>
16: </body>
17: </smil>
```

- urn:schemas-SC:edl — 111
- urn:schemas-SC:edl:clipInfo — 112
- urn:schemas-SC:edl:takeInfo — 113

FIG. 14

```
1:   <Contents>
2:       <Material uri="/CLPR/200709_0001_01/200709_0001_01.SMI" umid="..." ... >
3:       :
4:       </Material>
5:       <Material uri="/CLPR/200709_0002_01/200709_0002_01.SMI" umid="..." ... >
6:       :
7:       </Material>
8:       <Material uri="/CLPR/200709_0003_01/200709_0003_01.SMI" umid="..." ... >
9:
10:      <Component uri="/CLPR/200709_0003_01/200709_0003_01.MP4" umid="..." ... />
11:      <RelevantInfo uri="/CLPR/200709_0003_01/200709_0003_01M01.XML" ... />
12:      <RelevantInfo uri="/CLPR/200709_0003_01/200709_0003_01R01.BIM" ... />
13:      <RelevantInfo uri="/CLPR/200709_0003_01/200709_0003_01I01.PPN" ... />
14:      </Material>
15:      <Material uri="/CLPR/200709_0003_02/200709_0003_02.SMI" umid="..." ... >
16:      <Component uri="/CLPR/200709_0003_02/200709_0003_02.MP4" umid="..." ... />
17:      <RelevantInfo uri="/CLPR/200709_0003_02/200709_0003_02M01.XML" ... />
18:      <RelevantInfo uri="/CLPR/200709_0003_02/200709_0003_02R01.BIM" ... />
19:      <RelevantInfo uri="/CLPR/200709_0003_02/200709_0003_02I01.PPN" ... />
20:      </Material>
21:      <Material uri="/CLPR/FUJI0004_01/FUJI0004_01.SMI" umid="..." ... >
22:      :
23:      </Material>
24:      <Material uri="/CLPR/Kampake.MP4" umid="..." ... />
25:      :
26:      <Material uri="/TAKR/200709_0003/200709_0003.SMI" umid="..." ... >
27:      <RelevantInfo uri="/TAKR/200709_0003/200709_0003M01.XML" ... />
28:      <Component uri="/CLPR/200709_0003_01/200709_0003_01.SMI" umid="..." .../ >
29:      <Component uri="/CLPR/200709_0003_02/200709_0003_02.SMI" umid="..." .../ >
30:      </Material>
31:  </Contents>
```

RECORDING-AND-REPRODUCING APPARATUS AND RECORDING-AND-REPRODUCING METHOD

CROSS REFERENCES CROSS-REFERENCE TO RELATED APPLICATIONS

The present application claims priority from Japanese Patent Application No. JP 2006-269891, filed in the Japanese Patent Office on Sep. 29, 2006, the entire content of which is incorporated herein by reference.

BACKGROUND OF THE INVENTION

1. Field of the Invention

The present invention relates to a recording-and-reproducing apparatus and a recording-and-reproducing method, for example, which can be applied to a camera built-in type recording-and-reproducing apparatus.

2. Related Art

In recent years, low-cost recording media are widely used. The recording media include CD-RW Compact Disc-ReWritable) and DVD-RW (Digital Versatile Disc-ReWritable), on which data can be repetitively written or deleted.

On these disk-shape recording media, data can be recorded in conformity to the Universal Disk Format (UDF). The recorded disk-shape recording medium based on the UDF allows a user to randomly access the predetermined data. Thus the data, such as image data and audio data, can be written as contents on the recording medium and also the written contents can be deleted therefrom. Therefore, typically, the information written on the recording media can be collectively controlled with a content-control table in a content-control file, and so on.

For instance, the content-control table is provided to control attribution information, such as information about a pointer to the "content" representing a location where a content is recorded, recording time and data, or a protect; a thumbnail (image) of the content; and text information, such as the title of the content.

Therefore, when the content recorded on the recording medium is reproduced therefrom, the content data is accessed based on a pointer-indicated location on the "contents" of a content-control table. The reproduction information for reproducing the content (e.g., information about the codec-type or the data-resolution of data that constitutes the content) is then obtained from the data itself or part of the data. Subsequently, the data is reproduced based on the reproduction information thus obtained.

Furthermore, some of removable media including recording media, such as semiconductor memories, employ the FAT (File Allocation Table) file system. In this FAT file system, the writing of files becomes inefficient as the capacity of the removable medium increases. In the removable medium having a capacity of not less than 4 GB, there is a restriction that it should be divided into plural partitions before use. Thus, the removable medium is controlled so that it can be divided into small units and the units can be then dispersed to prevent repetitive uses of the same region. Therefore, the fear of damaging any file can be kept at the minimum, thereby allowing the file to be used efficiently.

Furthermore, the present applicant (joint applicant) proposes a video-program production supporting system in which data can be smoothly reproduced (see Japanese Patent Application Publication No. 2005-4850 (JP 2005-4850 A)). In this system for supporting the video-program production, a clip-generating unit generates a clip-information file, based on parameter information supplied from an information-acquisition unit, on which the attribute information of the respective essence data generated from a data-generating unit is written. The clip-information file is required for the reproduction of the respective essence data. A MediaProfile updating unit updates MediaProfile by generating a clip element in MediaProfile which is read out of an optical disk and stored in RAM. The clip element corresponding to the generated clip is generated on the basis of parameter information from an information-acquisition unit. On the clip element, the attribution information of a clip required for the clip reproduction is described.

SUMMARY OF THE INVENTION

However, the following disadvantages may occur when a clip generated by the technology described in the aforementioned JP 2005-4850 A is recorded on a removable medium. Specifically, a file size is limited in the aforementioned file system, so that two or more files (clips) can be generated during the period from the start of data recording to the end of the recording. Therefore, there is a disadvantage in that a recording material is hardly handled with only one recording unit (or reproduction unit) generated during the period from the start to the end of recording data on the recording medium.

One of conceivable methods for assembling such a plurality of files (clips) in one recording unit (or one reproduction unit) is a method that employs an edit list as described in the aforementioned JP 2005-4850 A. However, the edit list is used for an editorial purpose in the method. Thus, such an edit list is inconvenient in implementation of the camera built-in type recording-and-reproducing apparatus. For example, when such an edit list is used, a plurality of thumbnail images of the respective files (clips) edited at the time of data reproduction are undesirably displayed as a whole. In this case, what is demanded is to display only one thumbnail image (such as a first scene image) representing one recording unit (or reproduction unit) recorded on the removable medium at the time of starting the data-recording. In fact, however, the desired unit is displayed together with undesired other thumbnail images.

It is desirable to provide a recording-and-reproducing apparatus, which is capable of handling one recording unit (or reproduction unit) generated during the period from the start to the end of recording data and to provide a recording-and-reproducing method using such an apparatus.

According to an embodiment of the present invention, there is provided a recording-and-reproducing apparatus including: an information-acquisition device, a recording-control device, a recorded-file determination generation device, a recording-and-reproducing unit generation device, and a control-information updating device. The information-acquisition device is provided for acquiring control information required for reproducing the data when the data is recorded. The recording-control device is provided for controlling operations during the period from the start to the end of recording data on a recording medium. The recorded-file generation determination device is provided for determining whether a recorded file of the data exceeds a predetermined limit of a storage capacity of a file system in the recoding medium and sequentially generating a subsequent recorded file upon exceeding the limit. The recording-and-reproducing unit generation device is provided for generating a single recording-and-reproducing unit during the period from the start to the end of recording data on the recording medium indicated by the recording-control device based on a plurality of recorded files, which are sequentially generated by the recorded-file determination generation device upon exceeding the limit. The control-information updating device is provided for updating the control information by recording the single recording-and-reproducing unit generated by the recording-and-reproducing unit generation device on the control information.

According to the embodiment, at first, the information-acquisition device acquires control information required for data reproduction when the data is recorded. The recording-control device controls operations during the period from the start to the end of recording data on the recording medium. Here, the recorded-file generation determination device determines whether the recorded file of the data exceeds the limitation of the storage capacity of a file system in the recording medium. When exceeded, subsequent recorded files are sequentially generated. Consequently, during the period from the start to the end of recording data on the recording medium under control of the recording-control device, the recording-and-reproducing unit generation device generates a single recording-and-reproducing unit based on a plurality of recorded files. These files are sequentially formed by the recorded-file determination generation device upon exceeding the limit. Furthermore, the control-information updating device can record a single recording-and-reproducing unit generated by the recording-and-reproducing unit generation device on control information, thereby updating the control information.

According to another embodiment of the present invention, there is provided a recording-and-reproducing method including the steps of: acquiring information, controlling recording, determining generation of recorded-files, generating recording-and-reproducing unit, and updating control information. The information-acquisition step is provided for acquiring control information required for reproducing the data when the data is recorded. The recording-control step is provided for controlling operations during the period from the start to the end of recording data on the recording medium. The recorded-file-generation determination step is provided for determining whether a recorded file of the data exceeds a predetermined limit of a storage capacity of a file system in the recoding medium. In this step, subsequent recorded files are sequentially generated upon exceeding the limit. The recording-and-reproducing unit generation step is provided for generating a single recording-and-reproducing unit based on a plurality of recorded files during the period from the start to the end of recording data on the recording medium controlled by the recording-control step. The files are sequentially generated from the recorded-file-generation determination step upon exceeding the limit. The control information updating step is provided for updating the control information by recording the single recording-and-reproducing unit generated by the recording-and-reproducing unit generation step on the control information.

According to the embodiment, at first, control information required for data reproduction is acquired when the data is recorded in the information-acquisition step. In the recording-control step, operations from the start of recording data on the recording medium to the end of the recording are controlled. Here, in the recorded-file-generation determination step, it is determined whether the recorded file of the data exceeds the limit of the storage capacity of a file system in the recording medium. If exceeded, then subsequent recorded files are sequentially generated. Consequently, during a period from the start of recording data on the recording medium to the end of the recording under control of the recording-control step, in the recording-and-reproducing unit generation step, a single recording-and-reproducing unit is generated based on a plurality of recorded files, which are sequentially formed by the recorded-file-reproduction determination step upon exceeding the limit. Furthermore, in the control-information updating step, the single recording-and-reproducing unit generated by the recording-and-reproducing unit generation step is recorded on control information, thereby updating the control information.

According to the aforementioned embodiments of the present invention, during the period from the start to the end of recording data on the recording medium, a single recording-and-reproducing unit is generated based on a plurality of recorded files sequentially generated while exceeding the limit. The generated single recording-and-reproducing unit is then recorded on control information to update the control information. Therefore, there is an advantage in that a recording material can be handled with one recording unit (or one reproduction unit) generated during the period from the start to the end of recording data. The use of a camera built-in type recording-and-reproducing apparatus for capturing a moving image is based on such an advantage.

BRIEF DESCRIPTION OF THE DRAWINGS

FIG. 8 is a diagram that represents an example of MediaProfile shown in FIG. 5.

FIG. 14 is a diagram that represents content columns indicating a list of materials of MediaProfile.

DESCRIPTION OF THE PREFERRED EMBODIMENTS

Hereinafter, embodiments of the present invention will be described with reference to FIGS. 1 to 16.

Figure 1:
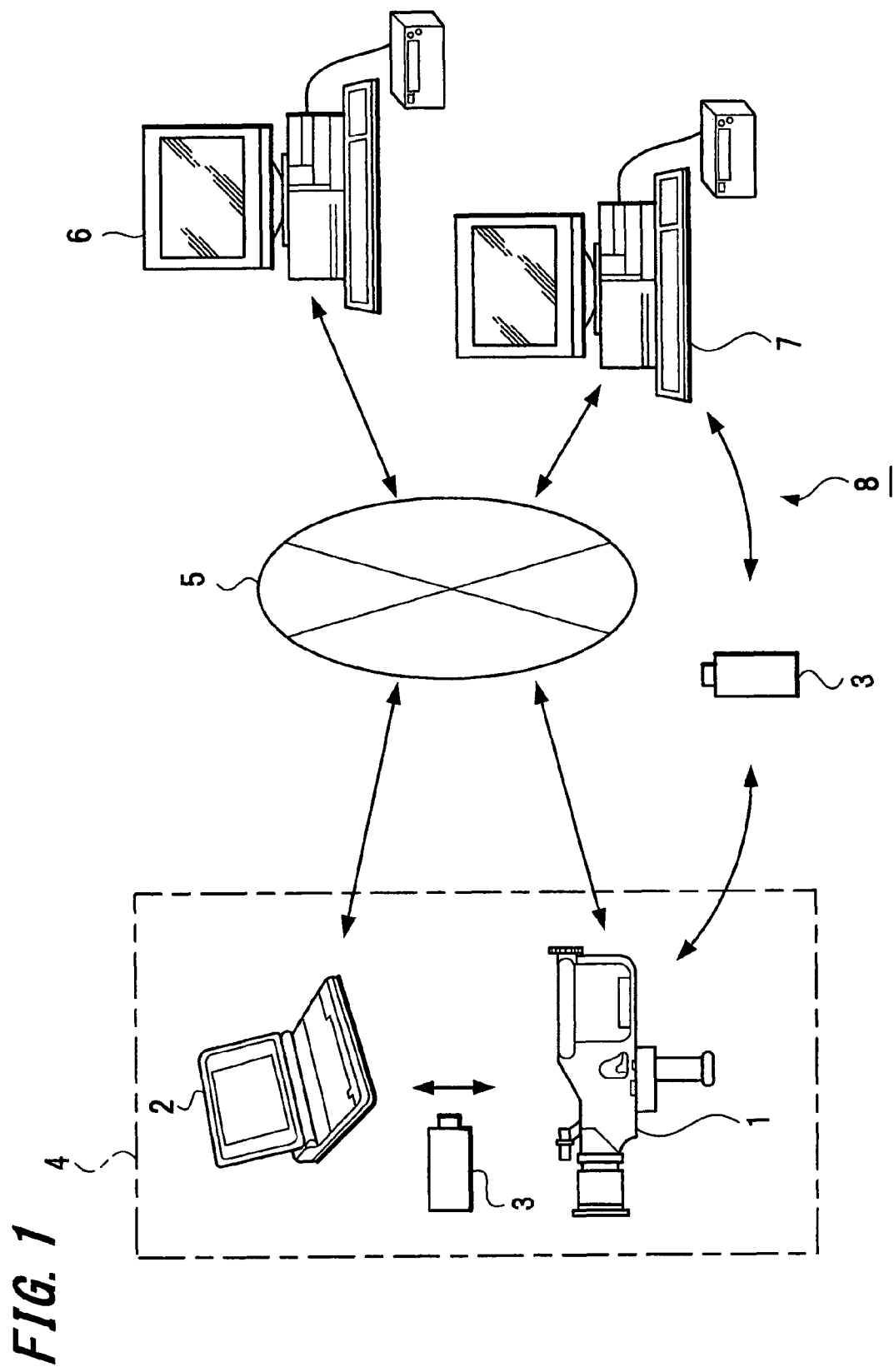
FIG. 1 is a diagram that represents a configuration example of a video-program production supporting system according to an embodiment of the present invention.

FIG. 1 illustrates an exemplified configuration of a system on which a camera built-in type recording-and-reproducing apparatus according to an embodiment of the present invention is applied.

In FIG. 1, a video-program production supporting system 8 is a system installed in a TV-broadcasting station that transmits television signals, a production company for video contents, such as video products and movies, or the like. In other words, it is a system for producing video programs, which are video products of television programs and movies. Specifically, the video-program production supporting system 8 is a system for effectively producing a video product by allowing metadata or the like added to the video program and constructed in electronic-file form to be consistently used among plural posts or stations sharing the production of the video program.

As shown in FIG. 1, the video-program production supporting system 8 includes: a planning terminal device 6, a network 5, a research terminal device 4, an editing terminal device 7, and a removable medium 3. The planning terminal device 6 is provided for carrying out planning of a video program. The network 5 is connected to the planning terminal device 6. The research terminal device 4 is connected to the network 5. The editing terminal device 7 is also connected to the network 5. The removable medium 3 is provided as a recording medium. In this case, the research terminal device 4 includes a camera built-in type recording-and-reproducing apparatus 1 and a field PC/PDA (Personal Computer/Personal Digital Assistant) 2 (hereinafter, referred to as a field PC 2). The planning terminal device 6 includes, for example, an information processor, such as a personal computer, and its peripheral equipment(s). The planning terminal device 6 is installed in a planning and organization station or the like where planning of a video program is carried out. The planning and organization station controls the whole process of video-program production and carries out planning and construction of the video program to prepare the script (scenario) of the video program. In addition, the planning and organization station indicates the contents of the production works to other stations, such as a research station and an editing station. The planning terminal device 6 carries out, for example, the process of preparing the metadata of a configuration table in electronic-file form for each video program. The metadata may include the production information corresponding to the script of the video program, or the like. The planning terminal device 6 supplies the generated configuration-table metadata to the research terminal device 4 or the like through the network 5. Thus, the planning and organization station is allowed to indicate a scene and a content, which should be researched or captured, to the editing station or the like.

The research terminal device 4 is a group of terminal devices used by editing stations that carry out researches. For instance, the research terminal device 4 includes a camera built-in type recording-and-reproducing apparatus 1 and a field PC 2. The editing station is one in which the research is actually carried out at the production site in accordance with, for example, the scenario or the production instruction from the planning and organization station. The editing station takes a picture of each scene constituting a video program and researches the conditions of video-shooting.

The camera built-in type recording-and-reproducing apparatus 1 is, for example, a video camera, such as CAMCORDER®. The video camera is an apparatus used for gathering materials for a broadcast news program, shooting the scenes of a sport game or the like, and shooting a video content, such as a movie. The camera built-in type recording-and-reproducing apparatus 1 is connected to the network 5 and obtains, for example, configuration-table metadata from the aforementioned planning terminal device 6 through the network 5. Subsequently, the camera built-in type recording-and-reproducing apparatus 1 displays the acquired configuration-table metadata on a predetermined display unit, or the like to allow a camera operator or a shooting staff to recognize the content to be shot. Furthermore, the camera built-in type recording-and-reproducing apparatus 1 is operated by a shooting staff. The respective scenes constituting a video program are then shot on the basis of the production-instruction information of the obtained configuration-table metadata.

The camera built-in type recording-and-reproducing apparatus 1 records image data and audio data obtained by taking a picture on the recording medium such as the removable medium 3. At this time, the camera built-in type recording-and-reproducing apparatus 1 records the data on video-contents as one clip as a whole on the recording medium 3 to control the data. Here, the video content data includes image data, audio data, and so on, which correspond to a clip (i.e., a unit representing one imaging processing).

Furthermore, the camera built-in type recording-and-reproducing apparatus 1 may incorporate not only an original image data (i.e., image data obtained by taking a picture) but also low-resolution image data (hereinafter, also referred to as "low-res data") or the like in a clip. Then, such a clip may be recorded on the removable medium 3 to control the data. The original data is high-definition image data having a large amount of data, so that it can be used for a completed video program. On the other hand, the low-res data is image data corresponding to an image frame with a smaller number of pixels produced by, for example, thinning out some pixels of each frame from the original image data. The low-res data has a low image quality and a smaller amount of data, compared with those of the original image data. Thus, the low-res data can be mainly used in the rough-editing process or the like because of its reduced loads on the respective processes of transmission, reproduction, and so on. Besides, the low-res data can be used for a thumbnail image or the like.

A plurality of clips recorded on the removable medium 3 by the aforementioned apparatus 1 are controlled by both MediaProfile and a clip-information file. MediaProfile, which will be described later with reference to FIG. 5, collectively controls the plurality of clips. In contrast, the clip-information file, which will be described later with reference to FIG. 6, controls the data for each clip, where data includes image data, audio data, or the like, which constitute the clip.

In the camera built-in type recording-and-reproducing apparatus 1, the clip image data or the like recorded on the removable medium 3 is displayed on a predetermined display unit on the basis of MediaProfile or the clip-information file. The shooting staff then confirms whether a picture is taken in response to the production-instruction information. In addition, the camera built-in type recording-and-reproducing apparatus 1 also allows the shooting staff to continuously confirm a plurality of shot scenes. That is, the shot scenes are continuously confirmed by representing a plurality of clip image data or the like recorded on the removable medium 3 continuously on the predetermined display unit or the like on the basis of MediaProfile or the clip-information file, as if data recorded on a tape is continuously reproduced.

In addition, if the amount of data in the clip does not exceed the limit (4 GB) of the FAT file system, then the clip may be not only a unit representing one imaging-processing. It may also be a unit representing a time period from the start to the end of taking a picture in the imaging-processing, a unit representing the length of any kind of data obtained by the imaging-processing, or a unit representing the amount of data of any kind of data obtained by the imaging-processing. Alternatively, the clip may represent the assembly of various kinds of data obtained by the imaging-processing.

A plurality of clips (such as image data and audio data) is recorded as a video-content on the removable medium 3 by the camera built-in type recording-and-reproducing apparatus 1. Then, the removable medium 3 is brought to, for example, the editing station or the field PC 2 and utilized therein. However, such transport of the removable medium 3 may require a certain amount of time. Thus, the camera built-in type recording-and-reproducing apparatus 1 may supply the image data to the planning terminal device 6, the field PC 2, or the editing terminal device 7 through the network 5. In this case, for shortening a transfer time (reducing a load for transfer processing), instead of the image data obtained by taking a picture, the camera built-in type recording-and-reproducing apparatus 1 may preferably supply the low-res data having a smaller amount of data corresponding to such data.

It should be noted that the camera built-in type recording-and-reproducing apparatus 1 may carry out the transfer processing of low-res data in any timing or in parallel with the imaging-processing or collectively after completing the imaging-processing.

As described above, the low-res data is transferred to the editing station before transportation of the removable medium 3. Thus, the editing station can carry out an editing task at a comparatively early stage (for example, simultaneously in parallel with the imaging-processing) even when the transported removable medium 3 is not arrived. Therefore, the efficiency of producing a video program can be raised. Furthermore, when the low-res data is transmitted through the network 5 as described above, the camera built-in type recording-and-reproducing apparatus 1 may record only the original image data and the original audio data on the removable medium 3 (the low-res data may not be recorded on the removable medium 3).

Furthermore, the recording medium, on which any video content can be recorded by the camera built-in type recording-and-reproducing apparatus 1, is not only limited to the exemplified recording medium 3 as described. The recording medium may be any of recording media as far as the FAT system is applied thereto. The removable media include semiconductor memories, such as flush memories, and other disk-shaped recording media.

The field PC 2 includes, for example, a portable information processor, such as a notebook-type personal computer or PDA, and its peripheral equipment(s). The field PC 2 is connected to the camera built-in type recording-and-reproducing apparatus 1 through any kind of wired-communication or wireless-communication. For instance, it can share the configuration-table metadata and the video-content with the camera built-in type recording-and-reproducing apparatus 1.

The field PC 2 may obtain, for example, configuration-table metadata from the planning terminal device 6 through the network 5. Alternatively, the field PC 2 may obtain configuration-table metadata from the camera built-in type recording-and-reproducing apparatus 1 through the network 5. The field PC 2 displays the acquired configuration-table metadata on a predetermined display unit to allow the person in charge of the editing station to recognize the contents which should be researched and shot.

Furthermore, the field PC 2 generates information on video-shooting conditions. Here, the video-shooting information is the information about the conditions of research and video-shooting generated in response to an input by the user, the person in charge of the editing station. Subsequently, the generated information about the conditions of video-shooting is added to the relevant column in the configuration-table metadata. The information about the shooting conditions may be text data or the like described from any of various stand points of every clip or every research location. The clip indicates one recording unit (or one reproduction unit) generated during the period from the start to the end of recording data. Such information may be useful in the subsequent editing process. In this way, the field PC 2 writes the information about the conditions of video-shooting therein to edit the configuration-table metadata. In addition, the field PC 2 supplies the information about the conditions of video-shooting as metadata to the camera built-in type recording-and-reproducing apparatus 1. Subsequently, the metaphase is added to the image data and the audio data obtained in the camera built-in type recording-and-reproducing apparatus 1.

The editing terminal device 7 includes, for example, an information processor, such as a personal computer, and its peripheral equipment(s). The editing terminal device 7 is installed in an editing station where a video content is subjected to the editing process. Here, the configuration-table metadata or the like reflects the production instruction or the scenario in the planning and organization station or the research situation in the editing station. Based on such metadata or the like, the editing station can edit the image data and the audio data obtained by the camera built-in type recording-and-reproducing apparatus 1 to complete a video problem.

The editing terminal device 7 obtains, for example, configuration-table metadata and low-res data from the camera built-in type recording-and-reproducing apparatus 1 through the network 5. Furthermore, the editing terminal device 7 obtains the original image data and the original audio data from the removable medium 3. On the removable medium 3, the clip (including image data and audio data) is recorded by the camera built-in type recording-and-reproducing apparatus 1. Furthermore, the editing terminal device 7 may also obtain direct-production instruction (instruction about the editing) from the planning terminal device 6, the field PC 2, or the like through the network 5.

The editing terminal device 7 reproduces and displays the acquired video-content in a preferable manner based on the configuration-table metadata obtained as described above. For instance, the editing terminal device 7 is operated by the user to sequentially display the data. In other words, the low-res data obtained through the network 5 or the original image data and the original audio data recorded on the removable medium 3 may be displayed in the order according the scenario. The original image data and the original audio data of all clips recorded on the removable medium 3 may be sequentially displayed. Alternatively, the image data in the desired clip may be only displayed. In addition, when the original image data recorded on the removable medium 3 is reproduced, the editing terminal device 7 reads out the data recorded on the removable medium 3 using a disk device or the like. Alternatively, the editing terminal device 7 may write the data on the removable medium 3. Furthermore, on this occasion, MediaProfile or a clip-information file for controlling the data recorded on the removable medium 3 is referenced.

Furthermore, for example, the editing terminal device 7 does not only reproduce and display the necessary image data or the like based on the configuration-table metadata in a preferable order. The device 7 may also carry out the process of editing the image data or the like obtained by research. For the editing process, there are a rough-editing process and an actual editing process.

The rough-editing process represents a simplified editing process on image data and audio data. For instance, in the rough-editing process, the editing terminal device 7 carries out the selection of a clip to be used in the actual editing among a plurality of clips when these clips are acquired. Then, a necessary video part is chosen from the data in the selected clip (Logging). Subsequently, for example, an editing-start position (In point) and an editing-end position (Out point) corresponding to the chosen video part are set using time codes or the like, respectively. The corresponding part is then extracted from the aforementioned clip data (Ingesting).

The actual editing process is responsible for connecting a plurality of image data. Here, the image data constitutes each of the clips treated with the rough-editing process. A final image adjustment or the like is carried out on the resulting image data to prepare a complete package data to be broadcast in a program or the like.

Furthermore, the editing terminal device 7 is also capable of recording the image data and the audio data as one clip as a whole on the removable medium 3 in a manner similar to the camera built-in type recording-and-reproducing apparatus 1. Here, the image data and the audio data are obtained, for example, through the network 5 or from another recording medium.

Furthermore, a plurality of the planning terminal devices 6, the camera built-in type recording-and-reproducing apparatuses 1, the field PCs 2, the editing terminal devices 7, and so on may be provided respectively. For instance, image data or the like obtained by more than one camera built-in type recording-and-reproducing apparatus 1 may be acquired by one editing terminal device 7 from the removable medium 3 or through the network 5. The data may be then subjected to the editing process. Alternatively, more than one editing terminal device 7 may edit the data supplied from one camera built-in type recording-and-reproducing apparatus 1.

In the above description, functional components are, for example, the planning terminal device 6, the camera built-in type recording-and-reproducing apparatus 1, the field PC 2, and the editing terminal device 7. These functional components have been described as, but not limited to, those independent from one another. Alternatively, the functions of the respective components may be partially or wholly combined with one another.

Furthermore, for example, the video-program production supporting system 8 may be provided with a center server (not shown) connected to the network 5. The center server is independent from the planning terminal device 6, the camera built-in type recording-and-reproducing apparatus 1, the field PC 2, and the editing terminal device 7. Thus, the system may be configured as a Client/Server system where the planning terminal device 6, the camera built-in type recording-and-reproducing apparatus 1, the field PC 2, the editing terminal device 7, and so on are provided as the respective clients.

Figure 2:
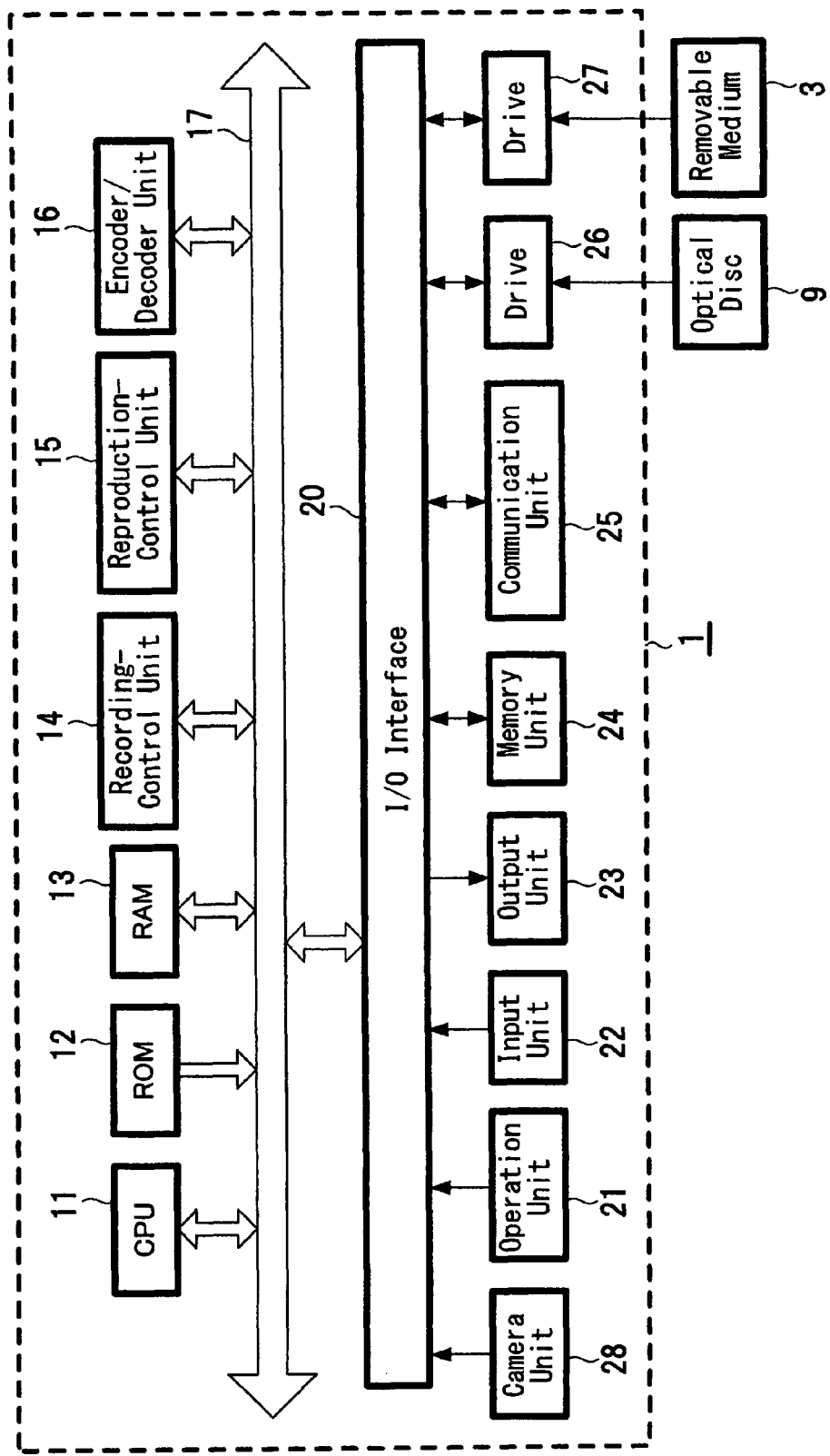
FIG. 2 is a block diagram that represents a configuration example of a camera built-in type recording-and-reproducing apparatus shown in FIG. 1.

FIG. 2 illustrates in detail an example of the configuration of the camera built-in type recording-and-reproducing apparatus 1 shown in FIG. 1. In FIG. 2, a central processing unit (CPU) 11 executes various processes based on programs stored in a read only memory (ROM) 12. In a random access memory (RAM) 13, data, programs, and so on, which will be required by the CPU 11 in executing various processes, are properly stored.

A recording-control unit 14 controls the recording of data on the removable medium 3 via a drive 27 according to a file system in the removable medium 3, which will be described later with reference to FIG. 5. The data includes image data, audio data, low-res data, or the like supplied from an encoder/decoder unit 16 or those stored in a memory unit 24.

A reproduction-control unit 15 controls the drive 27 according to the file system of the removable medium 3 and then reads out the image data, the audio date, the low-res data, or the like stored in the removable medium 3. Subsequently, the read-out data is supplied to the encoder/decoder unit 16.

The encoder/decoder unit 16 encodes the image data and the audio data input from a camera unit 28 or an input unit 22 using a predetermined codec and supplies the result to the memory unit 24 or recording-control unit 14. Furthermore, if necessary, the encoder/decoder unit 16 encodes the image data input from the input unit 22 based on, for example, the MPEG-4 format and then supplies it as low-res data to the memory unit 24 or the recording-control unit 14. In addition, the encoder/decoder unit 16 encodes the audio data input from the input unit 22 based on, for example, the ITU-TG. 711 A-Law format and then supplies it as low-res data to the memory unit 24 or the recording-control unit 14.

The encoder/decoder unit 16 outputs the image data, the audio data, or the low-res data supplied from the reproduction-control unit 15 to a monitor, a speaker, or the like that constitutes an output unit 23.

The CPU 11, the ROM 12, the RAM 13, the recording-control unit 14, the reproduction-control unit 15, and the encoder/decoder unit 16 are connected to one another through a bus 17. In addition, an I/O interface 20 is also connected to the bus 17.

The I/O interface 20 is connected to an operation unit 21 constructed of a key board and a mouse. A signal input into the operation unit 21 is output to the CPU 11 through the I/O interface 20. In addition, the I/O interface 20 is connected to the camera unit 28, the input unit 22, the output unit 23, the memory unit 24, a communication unit 25, a drive 26, and the drive 27. Here, the camera unit 28 is provided for shooting the subject and inputting the shot image data. The input unit 22 includes a microphone or the like for inputting audio data. The output unit 23 includes a monitor, such as a cathode ray tube (CRT) or a liquid crystal display (LCD), and a speaker. The memory unit 24 includes a hard disk, an electronically erasable and programmable read only memory (EEPROM), or the like.

The communication unit 25 exchanges data with the editing terminal device 7 and so on. For instance, the communication unit 24 includes an IEEE (Institute of Electrical and Electronic Engineers) 1394 port, an USB (Universal Serial Bus) port, an NIC (Network Interface Card) for the LAN (Local Area Network) connection, an analog modem, a TA (Terminal Adaptor), a DSU (Digital Service Unit), an ADSL (Asymmetric Digital Subscriber Line) model, or the like. Thus, for example, the communication unit 25 may exchange data with the editing terminal device 7 or the like through the network 5, such as the Internet or the Intranet.

The drive 27 is designed to detachably connect with the removable medium 3. The drive 27 can record image data and audio data on the removable medium 3 or reproduce the image data and the audio data recorded thereon by actuating the removable medium 3 attached thereon. The drive 26 is provided for an optical disk 9.

The camera unit 28 includes an imaging device, such as a CCD (charge coupled device) or a CMOS (complementary metal oxide semiconductor), and coverts a subject's image entered through an optical system formed of various kinds of lenses into an electric signal (i.e., image data). The image data is then input into the encoder/decoder unit 16 through the I/O interface 20 and the bus 17 under the control of the CPU 11.

The removable medium 3 may be a flash-memory type recording medium referred to as Memory Stick® proposed and produced by the present applicant. The Memory Stick® is a small light-weight plate-shaped recording medium (e.g., dimensions of 21.5 mm in length, 50 mm in width, and 2.8 mm in thickness) and can be used in any of personal computers, digital cameras, portable digital audio players, and so on. The removable medium 3 may be one having a storage capacity of several tens to several hundreds gigabytes and the transfer rate thereof may be increased.

The image data, the audio data, and so on recorded on the removable medium 3 are controlled as a plurality of clips (files) as a whole by a file system as described later with reference to FIG. 5. Here, when the image data, the audio data, and so on recorded on the removable medium 3 exceed the limit (4 GB) of the FAT file system, the subsequent clips (files) are sequentially generated. Furthermore, when the data does not exceed the limit (4 GB), one clip (file) is generated.

Subsequently, a plurality of clips (files), which are sequentially generated when exceeding the limit (4 GB) of the FAT file system during the period from the start of data recording to the end of the recording, are combined into a single recording unit (or reproduction unit). Therefore, a take is generated as such a unit.

In this file system, MediaProfile controls the plurality of clips and takes recorded on the recording medium 3. MediaProfile is a control file in which all of the clips and the takes made up of collected clips recorded on the removable medium 3 are described in a list.

When the removable medium 3 is attached to the drive 27, MediaProfile is read out of the removable medium 3 and then expanded in the RAM 13. When the clip to be reproduced is indicated, the clip-information file is read out of the removable medium 3 and then expanded in the RAM 13. Hereinafter, the image data, the audio data, the low-res data, and so on, which constitute the clip, will be collectively referred to as "essence data".

If required, the I/O interface 20 is further connected to the drive 26. The drive 26 is used when data is read out of or written on a recording medium 9, such as a magnetic disk, an optical disk, a magneto-optical disk, or a semiconductor memory.

Figure 3:
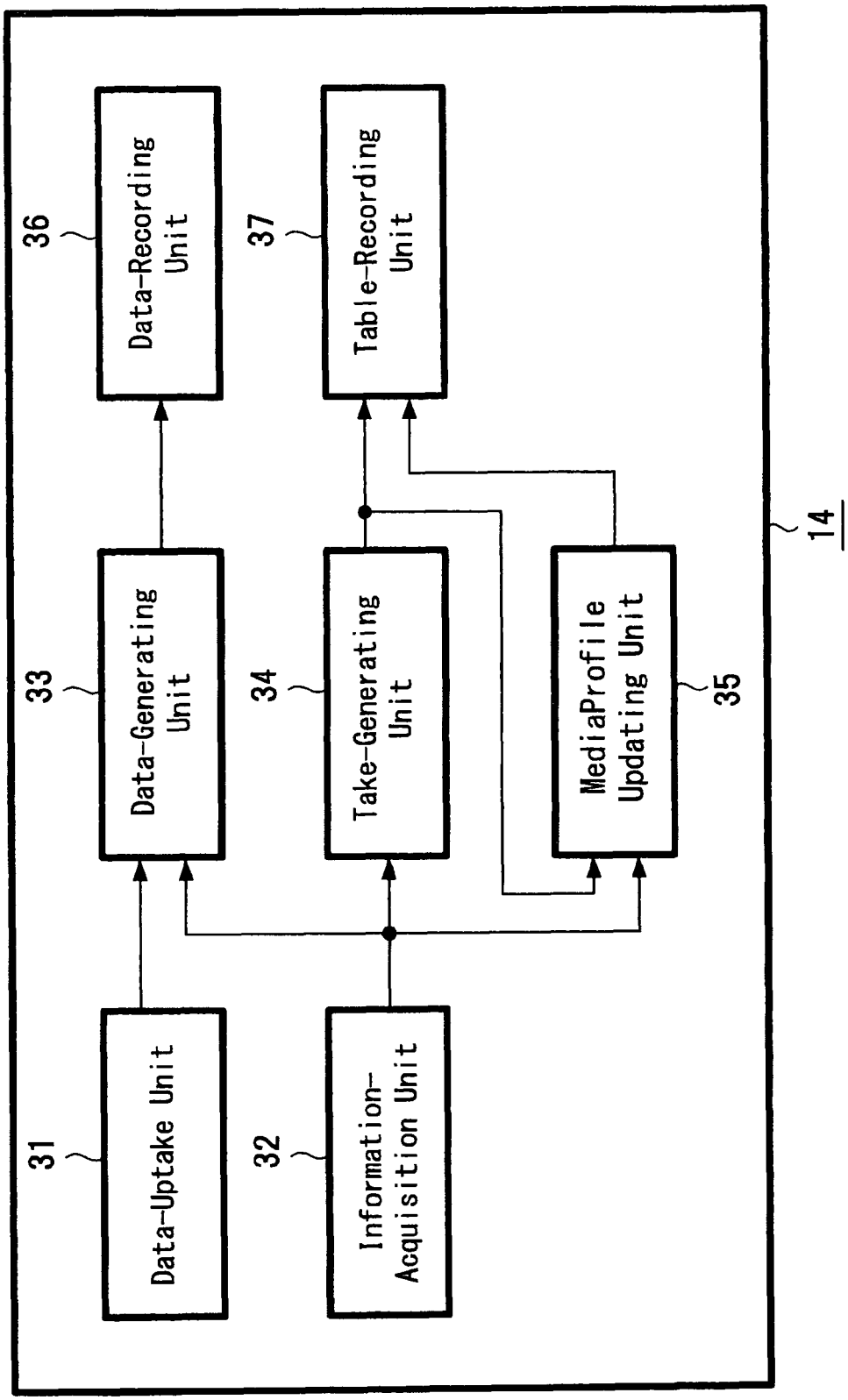
FIG. 3 is a block diagram that represents a configuration example of a recording-control unit shown in FIG. 2.

FIG. 3 illustrates an example of the configuration of the recording-control unit 14 shown in FIG. 2. In the example shown in FIG. 3, the recording-control unit 14 includes a data-uptake unit 31, an information-acquisition unit 32, a data-generating unit 33, a take-generating unit 34, a MediaProfile updating unit 35, a data-recording unit 36, and a table-recording unit 37.

The data-uptake unit 31 uptakes the image data, the audio data, the low-res data, and so on from the encoder/decoder unit 16 or the memory unit 24 and then supplies them to the data-generating unit 33. In addition, parameter information is stored in the RAM 13. Thus, when the information-acquisition unit 32 is instructed by the CPU 11 to initiate the data recording, the information-acquisition unit 32 obtains the parameter information from the RAM 13 and then supplies such information to the data-generating unit 33, the take-generating unit 34, and the MediaProfile generating part 35. The parameter information is the setting information of the camera built-in type recording-and-reproducing apparatus 1 for allowing the input unit 22 to input (shooting and recording) the image data and the audio data. In addition, the parameter information is reproduction information. Such information includes the information of resolutions of input image data and input audio data and the type of codec (coding method). In other words, the reproduction information can be required when the image data and the audio data are reproduced. The parameter information is previously set in the camera built-in type recording-and-reproducing apparatus 1 or set by the shooting staff or the like through the operation unit 21 and then stored in the RAM 13.

The data-generating unit 33 generates the respective essence data (the image data, the audio data, and the low-res data) in a predetermined format (MP4 format in this case, but MXF (material exchange format) is also available). In other words, the essence data is generated from the image data, the audio data, and the low-res data supplied from the data-uptake unit 31 based on the parameter information from the information-acquisition unit 32. Subsequently, the generated essence data is output to the data recording unit 36. In addition, the data-generating unit 33 generates metadata and so on in a predetermined format, respectively, on the basis of the parameter information from the information-acquisition unit 32, followed by outputting to the data-recording unit 36.

Furthermore, the above essence data may be any of various other files, such as a MP4 file. The MP4 file is one of the file formats. In this file, a compressed motion picture, which is in the format of MPEG (moving picture experts group)-4, is stored and defined by Part 14 of the ISO/IEC 14496 standard. The motion pictures in the MPEG-2 and MPEG-1 formats may be also stored in addition to the motion picture in the MPEG-4 format. In addition, a sound in AAC (advanced audio coding) format, the MP-3 format, or the like; a still picture in JPEG (joint photographic experts group) format, PNG (portable network graphic) format; and so on can be multiplexed and stored. Thus, the format of data therein may not be recognized until the inside of the file is analyzed.

The take-generating unit 34 generates a take directory when the parameter information is supplied from the information-acquisition unit 32 to generate a new take made up of collected clips for input data. In addition, on the basis of the parameter information from the information-acquisition unit 32, the take-generating unit 34 generates a clip-information file on which the attribute information of the respective essence data is described. Such attribute information may be required for the reproduction of the respective essence data of clips that constitute the take generated from the data-generating unit 33. Subsequently, the take-generating unit 34 outputs the generated clip-information file to the table-recording unit 37.

The MediaProfile updating unit 35 generates clip elements to MediaProfile on the basis of the parameter information from the information-acquisition unit 32, thereby updating MediaProfile. In this case the clip elements correspond to the clips constituting the generated take, while MediaProfile is read out of the removable medium 3 and expanded in the RAM 13. In each of the clip elements constituting the generated take, the attribute information of the clip required for the clip reproduction is described. The MediaProfile updating unit 35 outputs the updated MediaProfile to a table memory unit 37.

The data-recording unit 36 records the data generated from the data-generating unit 33 on the removable medium 3 through the drive 27. The table-recording unit 37 records the take directory, the clip-information file, and so on generated by the take-generating unit 34 and MediaProfile updated by the MediaProfile updating unit 35 on the removable medium 3 through the drive 27.

Figure 4:
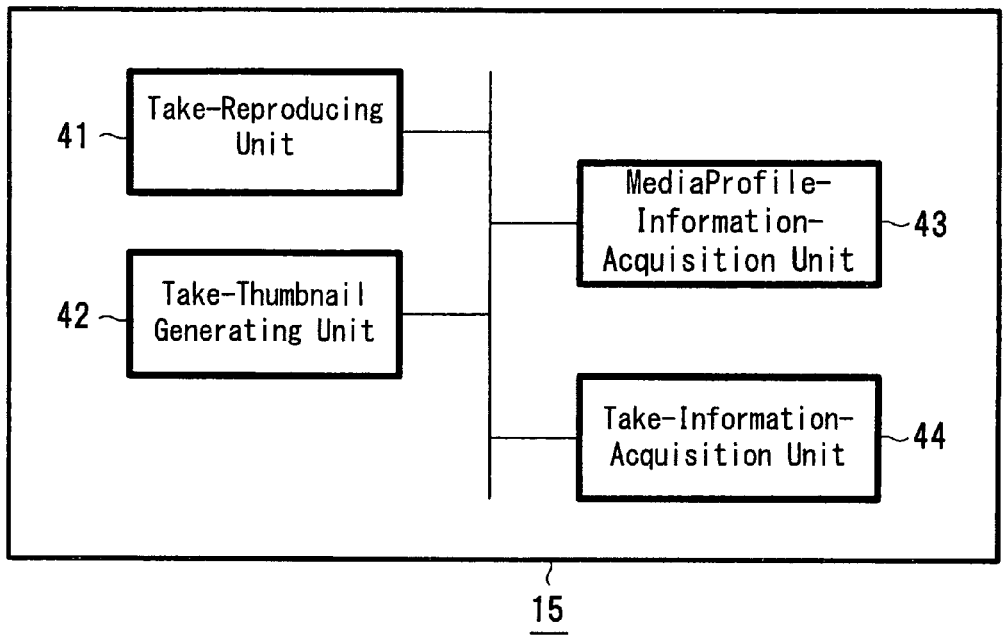
FIG. 4 is a block diagram that represents a configuration example of a reproduction-control unit shown in FIG. 2.

FIG. 4 illustrates an example of the configuration of the reproduction-control unit 15 shown in FIG. 2. In the example shown in FIG. 4, the reproduction-control unit 15 includes a take-reproducing unit 41, a take-thumbnail generating unit 42, MediaProfile-information-acquisition unit 43, and a take-information-acquisition unit 44. The take-reproducing unit 41 and the take-thumbnail generating unit 42 of the reproduction-control unit 15 control the MediaProfile-informationacquisition unit 43 or the take-information-acquisition unit 44 to read out data from the removable medium 3. Such a control operation is carried out based on the instruction of starting the reproduction of a take from the CPU 11 or starting the reproduction of a take-thumbnail.

Here, the reproduction of clip-thumbnails occurs such that the respective clip thumbnails are independently reproduced from one another. In contrast, the generation of take-thumbnail represents the process of generating a take-thumbnail as follows: Among all clips constituting a take recorded on the removable medium 3, the thumbnail image of the first scene of the recorded take is generated and displayed as if a thumb-sized image is displayed.

The take-reproducing unit 41 receives the instruction of starting the take reproduction from the CPU 11. When received, the take-reproducing unit 41 controls the MediaProfile-information-acquisition unit 43 or the take-information-acquisition unit 44 to obtain the information about reproduction of a clip that constitutes the corresponding take. The driver 27 is then controlled based on the obtained information to read out the image data, the audio data, the low-res data, or the like stored in the removable medium 3. The image data, the audio data, the low-res data, or the like read out of the removable medium 3 is then supplied to the encoder/decoder unit 16.

The take-thumbnail generating unit 42 receives the instruction of starting the take generation from the CPU 11. When received, the take-thumbnail generating unit 42 controls the MediaProfile-information-acquisition unit 43 or the take-information-acquisition unit 44 to obtain the information about reproduction of a thumbnail image of the first scene in the take recorded, among all clips that constitute the corresponding take. The driver 27 is then controlled according to the obtained information to read out the image data, the audio data, the low-res data, or the like stored in the removable medium 3. The image data, the audio data, the low-res data, or the like read out of the removable medium 3 is then supplied to the encoder/decoder unit 16. In other words, the take-thumbnail generating unit 42 reads out and outputs the information for reproducing the thumbnail image of the first scene registered in MediaProfile obtained by the MediaProfile-information-acquisition unit 43.

The MediaProfile-information-acquisition unit 43 obtains both the information about reproduction of a clip constituting the corresponding take and the information about reproduction of a thumbnail image of the first scene in the take from MediaProfile of the RAM 13. The operation can be carried out under the control of the take-reproducing unit 41 or the take-thumbnail generating unit 42.

The take-information-acquisition unit 44 reads out the clip-information file of clips constituting the corresponding take from the removable medium 3 through the drive 27 and then expands it in the RAM 13. The operation can be carried out under the control of the take-reproducing unit 41 or the take-thumbnail generating unit 42. In addition, the take-information-acquisition unit 44 obtains the information for reproducing clips constituting the corresponding take from the clip information file of the RAM 13. The take-information-acquisition unit 44 then outputs the information to the take-reproducing unit 41 and the take-thumbnail generating unit 42.

Next, the file system for controlling the data recorded on the removable medium 3 and directory structure and the files in the file system will be described. In this file system, the data recorded on the removable medium 3 can be controlled by the directory structure and the files as shown in FIG. 5.

Figure 5:
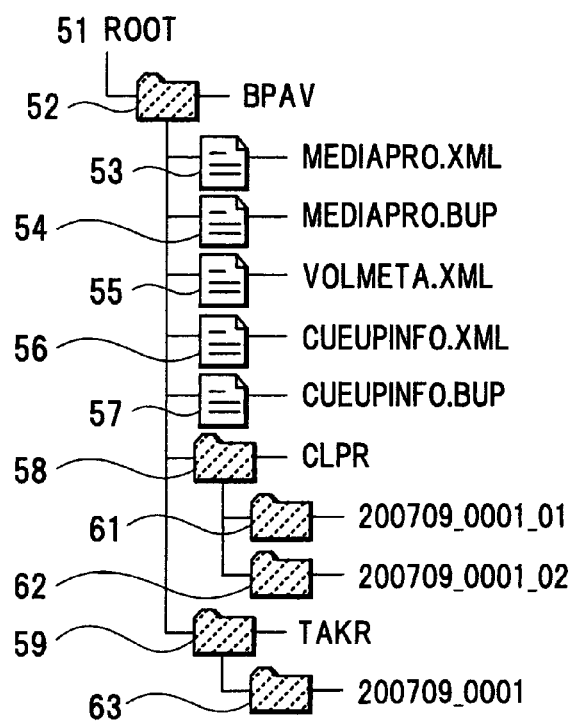
FIG. 5 is a diagram that represents a configuration example of a file system of a removable medium shown in FIG. 1.

FIG. 5 illustrates an example of the configuration of the file system of the removable medium 3. In FIG. 5, a root directory (ROOT) 51 is provided with a BPAV directory 52. In this subordinate directory 52, information about essence data including image data, audio data, and so on are provided. Furthermore, the root directory 51 is also provided with configuration-table data and so on (not shown).

The BPAV directory 52 is provided with a volume metafile (VOLMETA.XML) 55, MediaProfile (MEDIAPRO.XML) 53, and MediaProfile (MEDIAPRO.BUP) 54. The volume metafile (VOLMETA.XML) 55 is a file that contains information. The information may be of, for example, the title of or comments on all essence data recorded in the removable medium 3. In addition, the information may be of, for example, the pass of image data corresponding to the representative image as the representative frame of all image data recorded in the removable medium 3. The MediaProfile (MEDIAPRO.XML) 53 may contain, for example, control information for controlling a take corresponding to all clips recorded on the removable medium 3. The MediaProfile (MEDIAPRO.BUP) 54 may be a copy of the MediaProfile 53. The preparation of two files may increase reliability.

The BPAV directory 52 is further provided with a cue-up information file (CUEUPINFO.XML) 56 and a cue-up information file (CUEUPINFO.BUP) 57. Each of the files is metadata for the whole data recorded on the removable medium 3 and may be, for example, a file containing information, such as a medium attribute, a reproduction-starting position, or Reclnhi. Furthermore, the cue-up information file 57 is a copy of the cue-up information file 56. Preparation of two files may increase reliability. However, when the information is updated, the cue-up information file 56 may be only updated.

Furthermore, in addition to the aforementioned files, the BPAV directory 52 is further provided with a clip root directory (CLPR) 58 and a take root directory (TAKR) 59. Here, the directory 58 is a subordinate directory containing clip data. In addition, the directory 59 is a subordinate directory containing take data. The take root directory (TAKR) 59 is represented in a manner similar to the folder configuration of the typical edit root directory (EDTR). However the take root directory 59 is provided aside from this because of the following reasons: the edit root directory (EDTR) is used for the edition of other than the camera built-in type recording-and-reproducing apparatus 1. In contrast, the take root directory (TAKR) 59 is used for the recording and reproduction of a video material in the removable medium 3 in the camera built-in type recording-and-reproducing apparatus 1. Here, the edit root directory (EDTR) is not shown in the figure, but the details thereof can be found in FIG. 5 of JP 2005-4850 A as referred to above.

In the clip root directory (CLPR) 58, the clip data recorded on the removable medium 3 is divided every clip to be controlled in different directories. For instance, in the case of FIG. 5, the data of two clips are divided into two directories; a clip directory (200709_0001_01) 61 and a clip directory (200709_0001_02) 62, and controlled. In other words, each data of the first clip recorded on the removable medium 3 is controlled as a file in a subordinate directory of the clip directory 61. In addition, each data of the second clip recorded on the removable medium 3 is controlled as a file in a subordinate directory of the clip directory 62.

Furthermore, each clip directory contains rewrite-and-deletion-inhibit attribute information. The rewrite-and-deletion-inhibit attribute of each data is controlled as a subordinate directory of each clip directory. Besides, such attribute is controlled based on the rewrite-and-deletion-inhibit attribute information of the superordinate clip directory.

Furthermore, in the take root directory 59, take lists recorded on the removable medium 3 is controlled in divided different directories. The list can be controlled for each record and reproduction of a video material on the removable medium 3 in the camera built-in type recording-and-reproducing apparatus 1. For instance, in the case of FIG. 5, one take list is controlled in one directory, the take list directory (200709_0001) 63.

In other words, a take list, which shows a result of collecting clips generated during the period from the start to the end of the first recording, is controlled as a file in the subordinate directory of the take list directory 63. Likewise, hereinafter, take lists, which show the respective results of collecting clips generated during the period from the start to the end of the second and subsequent times of recording, are controlled as files in the subordinate directories of additional take list directories.

Figure 6:
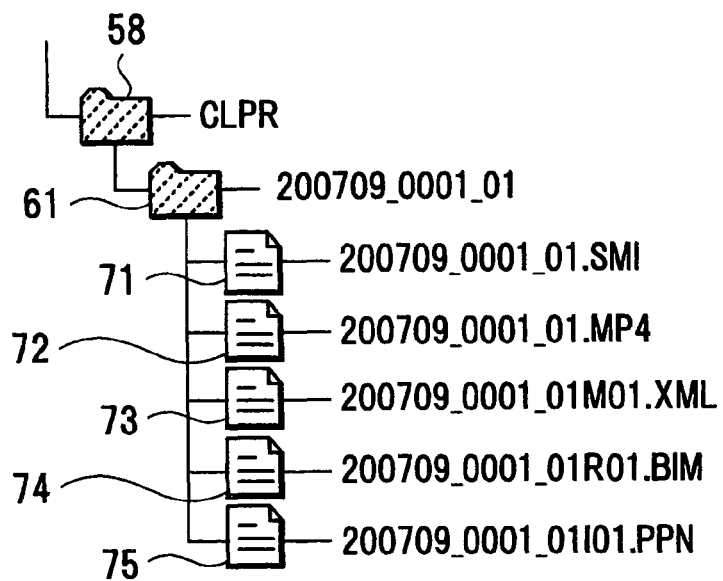
FIG. 6 is a diagram that represents a configuration example of a clip directory shown in FIG. 5.

In the subordinate directory of the clip directory 61 provided on the aforementioned clip root directory 58, each data of the clip initially recorded on the removable medium 3 is provided as a file as shown in FIG. 6 and controlled.

FIG. 6 illustrates an example of the configuration of the clip directory 61 shown in FIG. 5. In the case of FIG. 6, the subdirectory (200709_0001_01) of the clip directory 61 includes the following files:

- a clip-information file (200709_0001_01.SMI) 71, which is provided for controlling the clip;
- an image data file (200709_0001_01.MP4) 72, which contains the image data of the clip and the audio data of each channel;
- a clip metadata file (200709_0001_01M01.XML) 73, which contains clip metadata; here, the clip metadata is one on which any real-time property is not demanded and is provided for, for example, a conversion table for making a correlation between LTC (linear time code) and the frame number, corresponding to essence data of this clip;
- a frame metadata file (200709_0001_01R01.BIM) 74, which contains frame metadata; here, the frame metadata is one, such as LTC, on which any real-time property is demanded, including low-res data corresponding to the image data of the clip, corresponding to the essence data of the clip;
- a picture pointer file (200709_0001_01I01.PPN) 75, on which the frame-structure of the image data file 72 is described; here, the frame structure includes, for example, the information about the frame structure of the image data file 72 (e.g., information about compression format of each picture in the MPEG format or the like and the information about offset addresses or the like from the first of files); and the like. It should be noted that, as described above, the rewrite-and-deletion-inhibit attributes of these files are controlled based on the rewrite-and-deletion-inhibit attribute information contained in the clip directory 61.

In the case of FIG. 6, the image data, the low-res data, and the frame metadata, on which real-time properties can be demanded at the time of reproduction, are collectively controlled as a single file to prevent an increase in read-out time.

Furthermore, the real-time property is also required of the audio data at the time of reproduction. For corresponding to the multi-channel sounds, such as the 7.1-channel configuration, eight channels are prepared and controlled as the same files as those of the image data, respectively. In other words, but not limited to, the audio data has been explained so as to be controlled as eight files. The files corresponding to the audio data may be not more than seven or may be nine or more.

Similarly, the image data, the low-res data, and the frame metadata may be also controlled as two or more files depending on circumstances, respectively.

In FIG. 6, furthermore, the clip metadata, on which any real-time property is demanded, is controlled as a file different from the frame metadata on which the real-time property is demanded. This is because non-desired metadata is prevented from reading out during the usual reproduction of the image data or the like. Consequently, a reduction in time of reproduction process and a reduction in load required for the process can be attained.

Here, the clip metadata file 73 is described in XML (extensible markup language) format to give general versatility. The frame metadata file 74 is a BIM-format file obtained by compiling an XML-format file to reduce the processing time of the reproduction process and the load required for the process.

The exemplified file configuration of the clip directory 61 shown in FIG. 6 can be also applied to all of clip directories corresponding to the respective clips recorded on the removable medium 3. In other words, the exemplified file configuration shown in FIG. 6 can be applied to another subdirectory (200709_0001_02) 62 of the clip directory 61 and any of other clip directories shown in FIG. 5. Thus, the description thereof will be omitted.

In the above description, each file included in the clip directory corresponding to one clip has been described. However, the configuration of the file is not restricted by the examples as described above. As long as any clip metadata file corresponding to the clip is present in the subordinate directory of each clip directory, the file may have any configuration.

Figure 7:
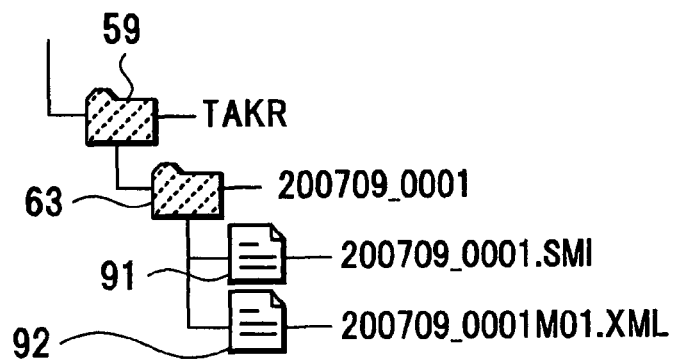
FIG. 7 is a diagram that represents a configuration example of a take directory shown in FIG. 5.

Next, an example of the file configuration in the subordinate directory of the take root directory 59 shown in FIG. 5 will be described. In the subordinate directory of the take list directory 63 formed in the aforementioned take root directory 59, the data of a take list is provided as a file as shown in FIG. 7 and controlled. The data of the take list is the information about a result of collecting clips generated during the period from the start to the end of the first recording of the respective data of the take recorded on the removable medium 3.

FIG. 7 illustrates an example of the configuration of the take list directory (200709_0001) 63 of FIG. 5. In the case of FIG. 7, the take list directory (200709_0001) 63 includes, for example, a take information file (200709_0001.SMI) 91 and a take-list take-metadata file (200709_000M01.XML) 92. The take information file (200709_0001.SMI) 91 is responsible for controlling a result (take list) obtained by collecting clips generated during the period from the start to the end of recording in a take. The take-list take-metadata file (200709_0001M01.XML) 92 contains take metadata corresponding to essence data (portion extracted as data after the end of recording in the essence data of the whole clips used in the recording) after collecting clips generated during the period from the start to the end of recording in a take. Alternatively, the take-list take-metadata file (200709_0001M01.XML) 92 contains take metadata, on which any real-time property is demanded, additionally generated based on the clip metadata. Here, the term "clip generated during the period from the start to the end of recording" is referred to as each of two clips: one in the clip directory (200709.0001_01) 61 and the other in the clip directory (200709.0001_02) 62.

In FIG. 7, the take metadata on which any real-time property is not demanded is controlled as a file different from the frame metadata on which the real-time property is demanded. This is because non-desired metadata is prevented from reading out during the reproduction of the image data or the like (during the reproduction of a result obtained by collecting the clips generated from the start to the end of recording as a take). Consequently, a reduction in time of reproduction process and a reduction in load required for the process can be attained.

On the basis of the result obtained by collecting clips generated from the start to the end of recording, the take-list take-metadata file 92 contains additional clip metadata generated according to the clip metadata (clip metadata file present in the subordinate directory of the clip root directory 58) of the clip used in the take. The take-list take-metadata file is generated every period from the start to the end of recording. Here, the take-list take-metadata file 92 is described in the XML format to give general versatility.

The exemplified file configuration of the take list directory 63 shown in FIG. 7 can be applied to all take lists (take-generation results from the start to the end of recording). In other words, even in any of other take list directories not shown in FIG. 5, the exemplified file configuration shown in FIG. 7 can be applied, so that the description thereof will be omitted hereinafter.

The above description have described each file contained in the take list directory corresponding to the operation of take production from the start to the end of one recording. However, the configuration of the file is not limited to any of the aforementioned examples. The file may be of any configuration as long as a take-list take-metadata file corresponding to the take-generation from the start to the end of recording is present.

Next, MediaProfile of the file system in the removable medium 3 will be described. As described above, MediaProfile is responsible for collectively controlling takes constituted by all clips recorded in the removable medium 3 and controlled in the XML format with its own schema.

FIG. 8 illustrates an example of the MediaProfile 53 shown in FIG. 5. Here, in FIG. 8, the numeral on each head line and the colon mark (:) are only provided for convenient description, but not part of codes. The same will be also applied to FIG. 9 and FIG. 14.

In <?xml version="1.0" encoding="UTF-8"?> in the first line represents, the MediaProfile 53 is described in the XML format (version "1.0") in the second and subsequent lines and is encoded in UTF-8. In the example of FIG. 8, from the second line to the forth line <MediaProfile xmlns="http://xmlns.sony.net/pro/metadata/MediaProfile"created At="2006-12-01T14:43:30+09:00"version="1.00">, the followings are represented: the most significant element <MediaProfile xmlns=" . . . > and the attributes of the most significant element "createdAt=" and "version=". "createdAt=" shows the created date and time of the MediaProfile 53. In addition, "version=" shows a schema version of the MediaProfile 53. The first to fourth lines as described above represent the attributes of the camera built-in type recording-and-reproducing apparatus 1 forming the MediaProfile 53 of the removable element 3 attached thereto.

<Contents> on lines 5 to 34 is an element representing the list of materials of the removable medium 3 attached to the camera built-in type recording-and-reproducing apparatus 1. In addition, if there is no material, the element is not generated. <Material> on lines 7 to 10 represents the sub-elements of <Contents>. All of them are essential descriptive elements except of videoType, audioType, and aspectRatio attributes. The attribute <Material uri> on line 7 indicates a location on the directory hierarchy of the corresponding clip (200709_0001_01.SMI). The attribute <umid> on line 10 represents a sole identifier in the worldwide, which is defined on the clip (200709_0001_01.SMI).

<Component> on line 11 is an element that directly describes the clip (200709_0001_01.MP4) corresponding to the <Material> element. <RelevantInfo> on lines 15 to 17 represents elements related to the clip (200709_0001_01.SMI), representing the information about non-real-time and real-time meta data and picture pointers.

Similarly, <Material> on lines 20 to 23 represents the sub-elements of <Contents>. All of them are essential descriptive elements except of videoType, audioType, and aspectRatio attributes. The attribute <Material uri> on line 20 indicates a location on the directory hierarchy of the corresponding clip (200709_0001_02.SMI). The attribute <umid> on line 23 represents a sole identifier in the worldwide, which is defined on the clip (200709_0001_02.SMI).

<Component> on line 24 is an element that directly describes the clip (200709_0001_02.MP4) corresponding to the <Material> element. <RelevantInfo> on lines 28 to 30 represents elements related to the clip (200709_0001_02.SMI), representing the information about non-real-time and real-time metadata and picture pointers.

<Material> on lines 33 to 34 represents the sub-elements of <Contents> and simultaneously represents an element about a take. The take is obtained by collecting the clip (200709_0001_01.SMI) described in <Material> in lines 7 to 10 and the clip (200709_0001_02.SMI) described in <Material> in lines 20 to 23. The attribute <Material uri> on line 33 represents the location on the directory hierarchy of the corresponding take (200709_0001.SMI). The attribute <umid> on line 34 represents a sole identifier in the worldwide, which is defined on the take (200709_0001.SMI). <RelevantInfo> on line 35 represents elements related to the take (200709_0001_SMI), representing the information about non-real-time metadata.

Here, <Component> on lines 37 to 40 represents elements directly describing two clips, clip (200709_0001_01.SMI) and clip (200709_0001_02.SMI). These clips constitute take (200709_0001.SMI), corresponding to the elements of <Material>.

Figures 9, 10:
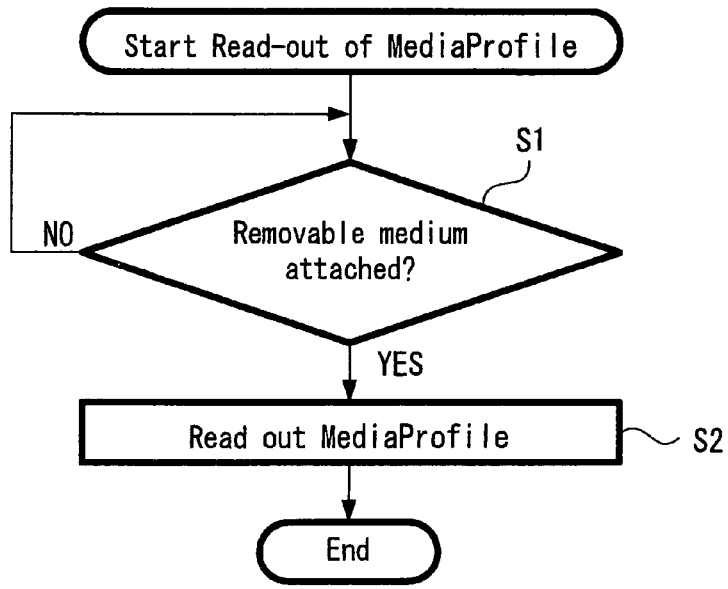
FIG. 9 is a diagram that represents an example of a take-information file shown in FIG. 7.
FIG. 10 is a flow chart that describes the process of reading out MediaProfile in a camera built-in type recording-and-reproducing apparatus shown in FIG. 1.

FIG. 9 illustrates an example of the description of the take-information file. In other words, FIG. 9 is an exemplified description of the take-information file (200709_0001.SMI) 91 shown in FIG. 7, representing in a manner similar to the exemplified description of the MediaProfile 53 in FIG. 8.

Specifically, as shown in FIG. 5, there are two clips (200709_0001_01) and (200709_0001_02), under the clip root directory (CLPR) 58. The take (200709_0001) 63 under the take root directory (TAKR) 59 includes these two clips (200709_0001_01) and (200709_0001_02). In this case, the take-information file (i.e., the content of (200709_0001.SMI) is an XML-format file as described below.

<?xml version="1.0" encoding="UTF-8" ?> in the first line represents that the take-information file is described in the XML format (version "1.0") in the second and subsequent lines and is encoded in UTF-8. In the example of FIG. 9, <smil xmlns="urn:schemas-$C:edl:takeInfo", umid="060A2B340101010501010D431300000064F5000013360 597080046FF FF21D90E", xmlns:xsi="http://www.w3.org/2001/XMLSchema-instance", xsi:schemaLocation="urn:schemas-$C:edl:takeInfo, edl_takeInfo.xsd"> is on lines 2 to 6. Here, the schema of the take-information file is represented as "$C:edl:takeInfo".

Here, a file, which is located at "ref src=" on line 10 under <!-- Clip1--> on line 9 and designates "umid" on line 11 is represented as a clip-information file (200709_0001_

01.SMI). In addition, a file, which is located at "ref src=" on line 13 under <!-- Clip2--> on line 12 and designates "umid" on line 14 is represented as a clip-information file (200709_0001_02.SMI).

Furthermore, the aforementioned example has been described so that the image data and the audio data are formed in a single file with the MP4 format. However, it is not limited to such an example. Another clip subdirectory may be formed. In this subdirectory, the image data, the audio data, the metadata, and so on may be divided into several files and prepared, for example, in the MXF format instead of the MP4 format.

Subsequently, with reference to the flowchart in FIG. 10, the MediaProfile read-out process carried out when the removable medium 3 is attached to the camera built-in type recording-and-reproducing apparatus 1 will be described.

The shooting staff attaches the removable medium 3 to the drive 27 for recording image data and audio data obtained by shooting with the camera built-in type recording-and-reproducing apparatus 1 or for reproducing the image data and the audio data recorded on the removable medium 3.

In step S1, the CPU 11 is in idle until the removable medium 3 is attached to the drive 27. When the CPU 11 determines that the removable medium 3 is attached to the drive 27, the process proceeds to step S2. In this step, the drive 27 is controlled to read out MediaProfile (for example, MediaProfile 53) of the removable medium 3. The read-out MediaProfile is then expanded (loaded) in the RAM 13, thereby completing the read-out process of MediaProfile.

In this way, the camera built-in type recording-and-reproducing apparatus 1 reads out MediaProfile from the removable medium 3 once the removable medium 3 is attached to the drive 27. MediaProfile is then expanded in the RAM 13. In the subsequent process, the writing and reading of data can be carried out on the removable medium 3 based on MediaProfile expanded in the RAM 13. Consequently, the data recorded on the removable medium 3 can be accessed quickly.

Next, referring to the flowchart of FIG. 11, the take-generation process in the camera built-in type recording-and-reproducing apparatus 1 will be described. In this case, the removable medium 3 is attached to the camera built-in type recording-and-reproducing apparatus 1 and the process of reading out MediaProfile is then carried out as described above with reference to FIG. 10. Subsequently, MediaProfile (for example, MediaProfile 53) is expanded in the RAM 13. The same will be also applied to the process of FIG. 15 and FIG. 16 as described below.

In step S11, the shooting staff operates a recording button of the operation unit 21 to order the recording of data on the removable medium 3. In this case, the camera built-in type recording-and-reproducing apparatus 1 is employed to record the image data and the audio data, which are input by taking a picture with the camera unit 28, on the recording medium. The operation unit 21 outputs an instruction signal for data-recording to the CPU 11. When the CPU 11 receives an instruction signal of data-recording from the operation unit 21, the CPU 11 instructs the input unit 22, the encoder/decoder unit 16, and the recording-control unit 14 to start the recording of data on the removable medium 3. In addition, at this time, the RAM 13 stores the parameter information of image data and audio data set by the shooting staff through the operation unit 21 (or previously set by the camera built-in type recording-and-reproducing apparatus 1). Here, the parameter information includes the information of resolution, the kind of codec, and so on.

The input unit 22 inputs image data with a camera and audio data with a microphone and then supplies the data to the encoder/decoder unit 16 based on the instruction from the CPU 11. The encoder/decoder unit 16 encodes the image data and the audio data supplied from the input unit 22 based on the parameter information stored in the RAM 13. Subsequently, the coded image data, audio data, and low-res data are supplied to the data-uptake unit 31, respectively.

Figures 11, 12:
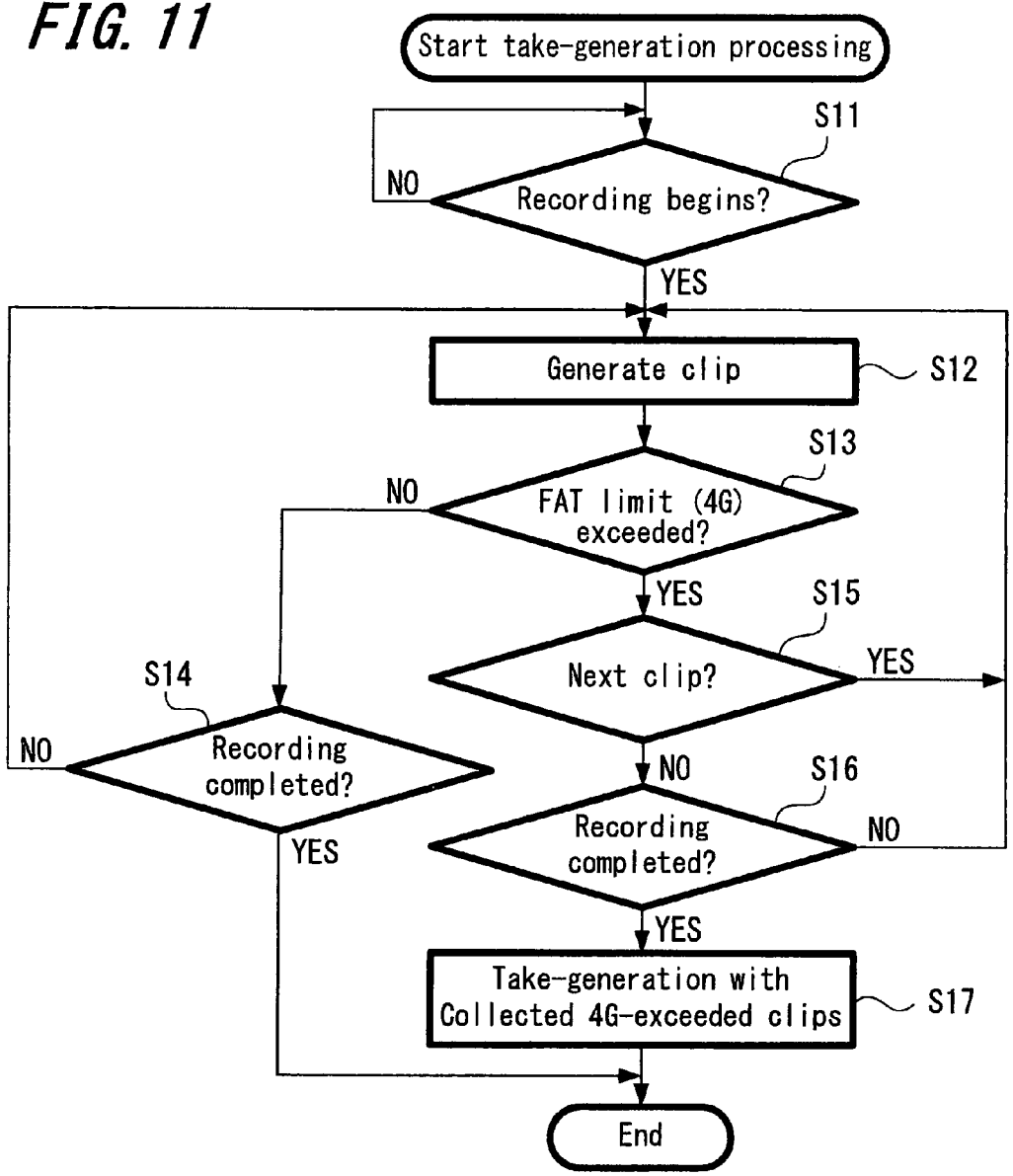
FIG. 11 is a flow chart that describes the process of producing a take of the camera built-in type recording-and-reproducing apparatus shown in FIG. 1.
FIG. 12 is a diagram that distinguishes between the namespaces of editing information, clip-info, and take-info.

In step S11 of FIG. 11, the information-acquisition unit 32 of the recording-control unit 14 is in idle until the instruction of recording start is input from the CPU 11. When the information-acquisition unit 32 determines that the CPU 11 has ordered the start of recording the data, the information-acquisition unit 32 of the recording-control unit 14 obtains the parameter information stored in the RAM 13. The parameter information is then supplied to the data-generating unit 33, the take-generating unit 34, and the MediaProfile updating unit 35. In addition, at this time, the data-uptake unit 31 supplies the image data, the audio data, and the low-res data from the encoder/decoder unit 16 to the data-generating unit 33.

When the parameter information is input from the information-acquisition unit 32, the process proceeds to step S12. The take-generating unit 34 generates a clip directory (for example, clip directory 61) to control the image data, the audio data, and the low-res data input in the camera built-in type recording-and-reproducing apparatus 1 as clips.

Here, in step S13, the take-generating unit 34 determines whether the image data, the audio data, or the like to be recorded on the removable medium 3 exceeds the limit (4 GB) of the FAT file system. If the data does not exceed the limit (4 GB) of the FAT file system in the determination step S13, then the process proceeds to step S14. The take-generating unit 34 determines whether the CPU 11 orders the end of data-recording. If the instruction of the end of data-recording is made in the determination step S14, then the take-generating unit 34 generates one clip (file) from the start to the end of recording.

When the data exceeds the limit (4 GB) of the FAT file system in the determination step S13, then the process proceeds to step S15 and the take-generating unit 34 determines whether the next clip (file) is generated. If the next clip (file) is generated in the determination step S15, then the process returns to step S12. Here, the process repeats the clip generation in step S12, the determination of whether the data exceeds the limit (4 GB) of the FAT system in step S13, and the determination of whether the next clip (file) is generated in step S15.

If the next clip (file) is not generated in the determination step S15, then the process proceeds to step S16. The take-generating unit 34 determines whether the CPU 11 orders the end of data-recording. If the end of data-recording is indicated in the determination step S16, then the process proceeds to step s17. The take-generating unit 34 generates a take as one recording unit (or reproduction unit) by collecting a plurality of clips (files) that exceed the limit (4 GB) of the FAT system and sequentially generated during the period from the start to the end of recording.

At this time, the take-generating unit 34 generates a take directory (for example, take directory 64) to collect clips generated during the period from the start to the end of recording and control the collected clips as a take.

In this case, the take-generating unit 34 outputs the clip directory generated by the clip-generation process in the above step S12 and the take directory generated by the take-generation process in step S17 to the table-recording unit 37. The table-recording unit 37 records the clip directory and the take directory from the take-generating unit 34 on the removable medium 3 through the drive 27.

In addition, after recording the clip directory and the take directory as described above, the data-generating unit 33 generates a header and a footer of the essence data from the data-uptake unit 31 based on the parameter information supplied from the information-acquisition unit 32. The data-generating unit 33 then generates an MP4-formatted essence data file (for example, an image data file 72, a non-real time metadata file 73, and a real-time metadata file 74) formed of the header, the footer and the body (essence data) generated as described above. The respective essence data file is output to the data-recording unit 36. The data-recording unit 36 records the essence data file from the data-generating unit 33 on the removable medium 3 through the drive 27.

The data-generating unit 33 generates a frame-metadata data file (for example, frame-metadata data file 74) based on the parameter information from the information-acquisition unit 32 and the image data and the audio data from the data-uptake unit 31. The data-generating unit 33 then outputs the frame-metadata data file to the data-recording unit 36. Subsequently, the data-recording unit 36 records the frame-metadata data file from the data-generating unit 33 on the removable medium 3 through the drive 27.

The data-generating unit 33 generates a clip-metadata data file (for example, clip-metadata data file 73) based on the parameter information from the information-acquisition unit 32 and the image data and the audio data from the data-uptake unit 31. The data-generating unit 33 then outputs the clip-metadata data file to the data-recording unit 36. Subsequently, the data-recording unit 36 records the clip-metadata data file from the data-generating unit 33 on the removable medium 3 through the drive 27.

The data-generating unit 33 generates a picture-pointer file (for example, picture-pointer file 75) based on the parameter information from the information-acquisition unit 32 and the image data from the data-uptake unit 31. The data-generating unit 33 then outputs the generated picture-pointer file from the data-generating unit 33 to the data-recording unit 36. The data-recording unit 36 records the picture pointer file on the removable medium 3 through the drive 27.

The take-generating unit 34 generates a clip-information file (for example, clip-information file 71) and a take-information file (for example, take-information file 91) based on the parameter information from the information-acquisition unit 32. Specifically, the take-generating unit 34 generates a take-information file on which the followings are described:

an attribute information (for example, on line 3 of FIG. 9, umid="060A2B340101010501010D431300000064F50000 13360597080046FF FF21D90E") described on the basis of the respective essence data generated from the data-generating unit 33; and a schema-attribute information (for example, on line 4 of FIG. 9, xsi:schemaLocation="urn:schemas-$C:edl:takeInfo) required for the reproduction of essence data described on the basis of the parameter information from the information-acquisition unit 32.

Furthermore, the take-generating unit 34 generates a take-information file in which clips constituting a take are collected. The take-generating unit 34 then outputs the generated clip-information file and the generated take-information file to the table-recording unit 37. Subsequently, the table-recording unit 37 records the clip-information file and the take-information file from the take-generating unit 34 on the removable medium 3 through the drive 27.

Here, the take generated as a single recording-and-reproducing unit from the take-generating unit 34 is separately defined from editlist of information for clips (a plurality of recorded-files) and in another namespace. Here, the term "namespace" is a concept for identifying the XML-file format. The namespaces can be allocated individual URLs. In FIG. 12, so as to represent the definition of namespace 110, URL provided with the identifier: edl 111 represents the namespace of the common editing-information editlist. In contrast, the "URL provided with the identifier: edl 111" provided with an additional identifier: clipinfo 112 represents the namespace of unique clipinfo. Furthermore, the "URL provided with the identifier: edl 111" provided with an additional identifier: clipinfo 112 and further provided with "an identifier: takeinfo" 113 represents the namespace of unique takeinfo. These namespaces may be assigned to individual manufactures or applicants by the authorized specification controller or the specification control organization.

In the aforementioned example, the image data, the audio data, the low-res data, and so on in the MP4-file format (i.e., file format for storing a compressed motion picture in the MPEG-4 format) have been exemplified, but not limited thereto. The aforementioned example may be applied to image data, audio data, low-res data, and so on in any of other file formats, such the MXF-file format.

Figure 13:
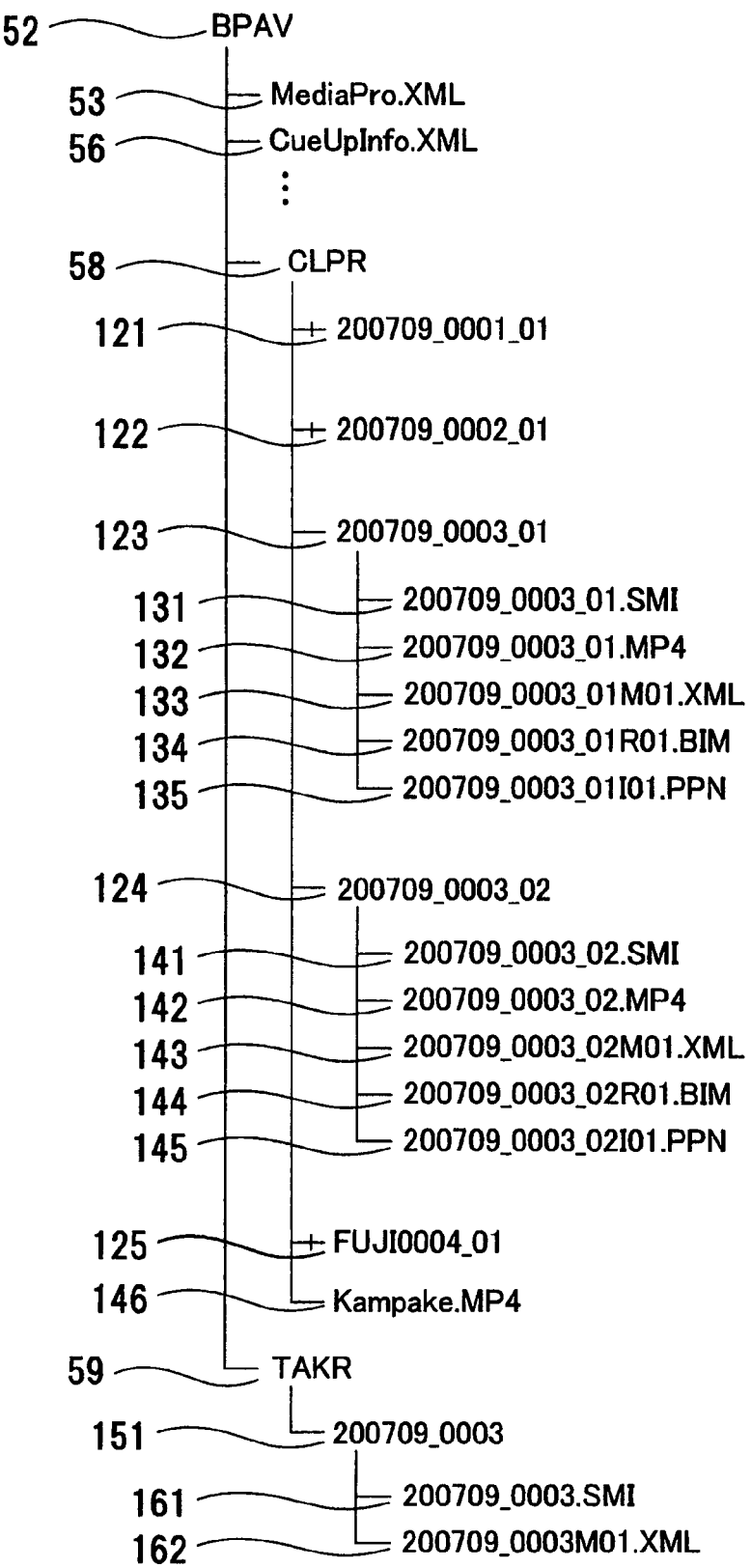
FIG. 13 is a diagram that represents a configuration example in consideration of the implementation of the file system of the removable medium to image data or the like in the MP4-file format.

FIG. 13 illustrates an exemplified file configuration in consideration of the file system of the removable medium with respect to the image data and so on in the MP4-file format. In FIG. 13, components corresponding to those in FIG. 5 are provided with the same symbols to omit the detailed descriptions thereof, respectively. In addition, in FIG. 13, one provided with the plus sign (+) indicates the presence of a sub-element on the line, but not part of the directory.

In FIG. 13, the BPAV directory 52 is provided with MediaProfile (MediaPro.XML) 53 and a cue-up information file (CueUpInfo.XML) 56. Here, the MediaProfile (MediaPro.XML) 53 contains, for example, control information for controlling takes and take lists corresponding to all clips recorded on the removable medium 3. In addition, the cue-up information file (CueUpInfo.XML) 56 is a metadata for the whole data recorded on the removable medium 3, such as a file containing information of a medium attribute, a reproduction-starting position, or RecInhi.

In addition, the BPAV directory 52 is provided with a clip root directory (CLPR) 58 and a take root directory (TAKR) 59 in addition to the aforementioned files. The clip root directory (CLPR) 58 includes a subordinate directory in which clip data is placed. The take root directory (TAKR) 59 includes a subordinate directory in which take list data is placed.

In the clip root directory 58, the clip data recorded on the removable medium 3 is divided into different directories and controlled with respect to every clip. For instance, in the case of FIG. 13, six clip data are divided into four directories and controlled, respectively. The directories are a clip directory (200709_0001_01) 121, a clip directory (200709_0002_01) 122, a clip directory (200709_0003_01) 123, and a clip directory (200709_0003_02) 124. That is, the directories are provided with the serial number of the camera built-in type recording-and-reproducing apparatus 1 in which these data are recorded.

The clip directory (200709_0003_01) 123 of clips in amount not more than the limit (4 GB) of the FAT file system from immediately after the recording-start is provided with a clip-information file (200709_0003_01.SMI) 131, an image data file (200709_0003_01.MP4) 132, a non-real-time metadata file (200709_0003_01M01.XML) 133, a real time metadata file (200709_0003_01R01.BIM) 134, and a picture pointer file (200709_0003_01I01.PPN) 135. The clip-information file (200709_0003_01.SMI) 131 is provided for controlling the clips. The image data file (200709_0003_01.MP4) 132 contains the image and the audio data of the clips. The non-real-time metadata file (200709_0003_01M01.XML) 133 contains a clip metadata. That is, the clip metadata is metadata, on which any real-time property is not demanded. The metadata may be of, for example, a conversion table or the like making a correlation between LTC (Linear Time Code) and the frame number, which corresponds to the essence data of the clip. A real time metadata file (200709_0003_01R01.BIM) 134 contains frame metadata. That is, the frame metadata is metadata, on which the real-time property is demanded, containing low-res data corresponding to the image data of the clip, such as LTC, corresponding to the essence data of the clips. The picture pointer file (200709_0003_01I01.PPN) 135 describes a frame structure of the image data file 142. The frame structure may be, for example, information about a compression format and the information about offset addresses from the head of the file for each picture in the MPEG format or the like.

Furthermore, the clip directory (200709_0003_02) 124 of data clips in amount more than the limit (4 GB) of the FAT file system to immediately before the recording-end is provided with a clip-information file (200709_0003_02.SMI) 141, an image data file (200709_0003_02MP4) 142, a non-real-time metadata file (200709_0003_02M01.XML) 143, a real time metadata file (200709_0003_02R01.BIM) 144, and a picture pointer file (200709_0003_02I01.PPN) 145. The clip-information file (200709_0003_02.SMI) 141 is provided for controlling the clips. The image data file (200709_0003_02MP4) 142 contains the image and the audio data of the clips. The non-real-time metadata file (200709_0003_02M01.XML) 143 contains a clip metadata. That is, the clip metadata is metadata, on which any real-time property is not demanded. The metadata may be of, for example, a conversion table or the like making a correlation between LTC (Linear Time Code) or the like corresponding to the essence data of the clips and the frame number. The real time metadata file (200709_0003_02R01.BIM) 144 contains frame metadata. That is, the frame metadata is metadata, on which the real-time property is demanded. The metadata may contain low-res data corresponding to the image data of the clips, such as LTC, corresponding to the essence data of the clips. The picture pointer file (200709_0003_02I01.PPN) 145 describes a frame structure of the image data file 142 is described. The frame structure may be, for example, information about a compression format and information about offset addresses from the head of the file every picture in the MPEG format or the like.

Furthermore, for representing that the data is one recorded by a personal computer (PC) or the like except of the camera built-in type recording-and-reproducing apparatus 1, a clip directory (FUJI0004_01) 125 and a clip (Kampake.MP4) 146 are described. In this case, the file name is changed by replacing the serial number of the camera built-in type recording-and-reproducing apparatus 1 with "FUJI". In addition, the clip (Kampake.MP4) 146 is directly below the clip root directory (CLPR) 58.

In other words, each clip (file) of both the clip directory (200709_0001_01) 121 (the first one recorded on the removable medium 3) and the clip directory (200709_0002_01) 122 (the second one recorded on the removable medium 3) is one generated as a single clip (file). In this case, the single clip (file) is generated in amount of not more than the limit (4 GB) of the FAT file system during the period from the start to the end of recording.

In contrast, clips (files) of the third clip directory (200709_0003_01) 123 and the forth clip directory (200709_0003_02) 124 are sequentially generated in amount larger than the limit (4 GB) of the FAT file system during the period from the start to the end of recording.

Furthermore, in the take root directory 59, take lists recorded in the removable medium 3 are divided into different directories. In addition, the take lists are controlled for the respective recording and reproduction process of a video material for the removable medium 3 in the camera built-in type recording-and-reproducing apparatus 1. For instance, in the case of FIG. 13, one take list is controlled as a take list directory (200709_0003) 151.

In other words, the take list represents the collected clips (files) of the third clip directory (200709_0003_01) and the forth clip directory (200709_0003.02) 124. Here, they are generated during the period from the start to the end of the first recording of the take recorded on the removable medium 3. Such take list is controlled as a file generated as a take of one recording unit (or reproduction unit) of the subordinate directory of the take list directory (200709_0003) 151.

The take list directory (200709_0003) 151 includes, for example, a take-info file (200709_0003.SMI) 161 and a non-real-time metadata file (200709_0003M01.XML) 162. The take-info file (200709_0003.SMI) 161 is responsible for controlling a result (take list) obtained by collecting clips generated during the period from the start to the end of recording as takes. The non-real-time metadata file (200709_0003M01.XML) 162 contains take metadata on which any real-time property is not demanded. The take metadata may correspond to essence data (portion extracted as data after the end of recording in the essence data of the whole clips used in the recording) after collecting clips generated during the period from the start to the end of recording in a take. Alternatively, the take metadata may be one additionally produced on the basis of the clip metadata.

Next, the process of updating MediaProfile by writing the take list file (200709_0003.SMI) 161 generated in FIG. 13 as described above into MediaProfile will be described. In FIG. 14, the list of MediaProfile materials is represented as a content list. From lines 1 to 20 of the contents, locations of the files on the directory hierarchy are represented, as material items, respectively. Here, the files includes: the clip directory (200709_0001_01) 121, the clip directory (200709_0002_01) 122, the clip directory (200709_0003_01) 123, and the clip directory (200709_0003_02) 124. These files are subordinate to the clip root directory (CLPR) 58 as shown in FIG. 13.

Furthermore, the locations of the files shown in FIG. 13 on the directory hierarchy are represented as material items on lines 21 to 25, respectively. Here, the files include the subordinate clip directory (FUJI0004_01) 125 of the clip root directory (CLPR) 58 and a clip (Kampake.MP4) 146 directly below the clip root directory (CLPR) 58.

Furthermore, the locations of the respective files of the take list directory (200709_0003) 151 on the directory hierarchy are represented as material items on lines 26 to 31. Here, the material item is provided with component items on lines 28 and 29. In addition, in these component items, the locations of the respective files on the directory hierarchy and also the contents of the respective files are recorded as content information that constitutes a take-info file (200709_0003.SMI) 161. Here the above files are the clip-information file (200709_0003_01.SMI) 131 and the clip-information file (200709_0003_02.SMI) 141.

Figure 15:
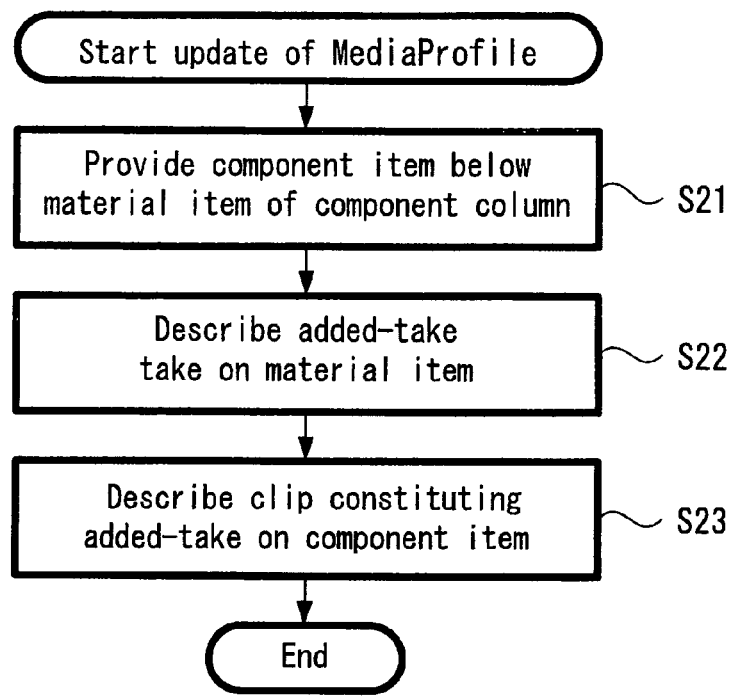
FIG. 15 is a flow chart that describes the process of updating MediaProfile of the camera built-in type recording-and-reproducing apparatus shown in FIG. 1.

FIG. 15 illustrates the flow chart of the process for updating MediaProfile shown in FIG. 14 as described above. In step S21 in FIG. 15, at first, the MediaProfile updating unit 35 shown in FIG. 3 is provided with a component item below the material item of the content column of the medium file. Specifically, the MediaProfile updating unit 35 forms component items on lines 28 and 29 below the material items from lines 2 to 25 of the content columns of MediaProfile shown in FIG. 14.

Next, in step S22, the MediaProfile updating unit 35 describes the added take on the material item. Specifically, the MediaProfile updating unit 35 records the locations of the respective files on the directory hierarchy on the material items on lines 26 to 27 of the content columns of MediaProfile shown in FIG. 14. Here, the files are a take-info file (200709_0003.SMI) 161 additionally generated and a take-list non-real-time metadata file (200709_0003M01.XML) 162.

Furthermore, in step S23, the MediaProfile updating unit 35 describes clips that constitute the take added in step S22. Specifically, the MediaProfile updating unit 35 records the locations of the respective files on the directory hierarchy and the contents of the respective files as the information of contents of the added take-info file (200709_0003.SMI) 161 on the component items of lines 28 and 29 provided on the material items of the content columns of MediaProfile shown in FIG. 14. Here, the files are a clip-information file (200709_0003_01.SMI) 131 and a clip-information file (200709_0003_02.SMI) 141.

As described above, clips that constitute the take are described in MediaProfile. Thus, when the data recorded on the removable medium 3 is reproduced, the data of clips that constitute the take can be reproduced by only the data of MediaProfile. Consequently, there is no need of directly reading out the individual clip data, so that the time required for the reproduction process can be shortened.

Figure 16:
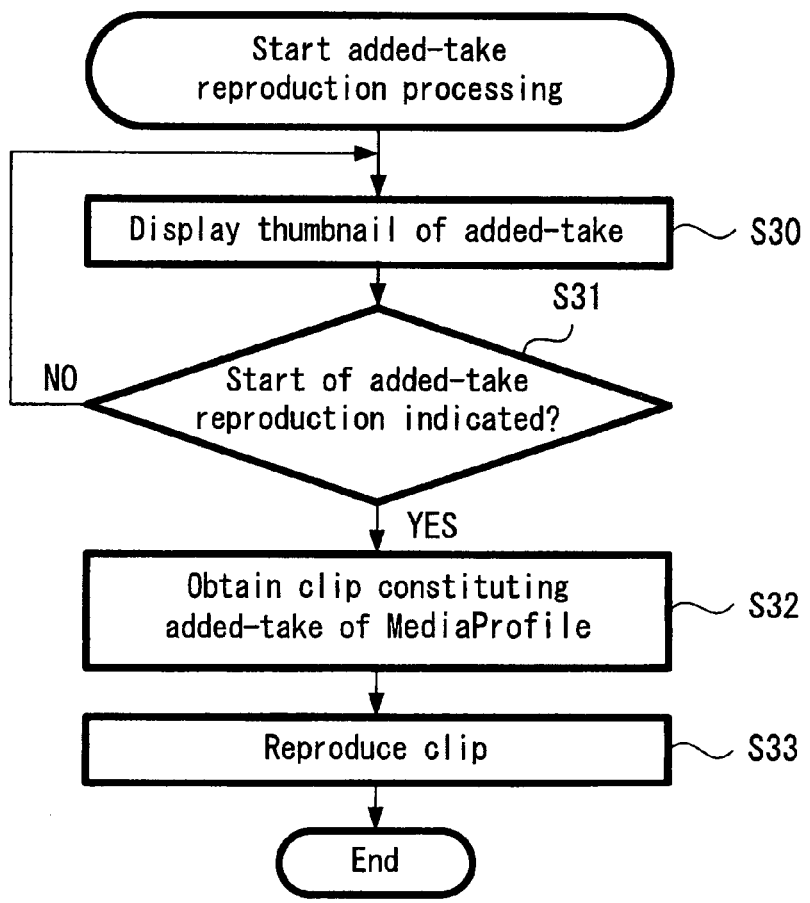
FIG. 16 is a flow chart that describes the process of reproducing a take added to MediaProfile of the camera built-in type recording-and-reproducing apparatus shown in FIG. 1.

Furthermore, with reference to the flow chart of FIG. 16, the reproduction process of the added take in the camera built-in type recording-and-reproducing apparatus 1 will be described. In FIG. 16, the case in which the clips constituting the take can be reproduced based on MediaProfile will be described.

For confirming the shot clip, the shooting staff operates a button of the operation unit 21 to indicate the reproduction of the desired clip. The operation unit 21 outputs a signal of indicating the clip reproduction to the CPU 11. Subsequently, the CPU 11 indicates the start of the clip reproduction from the removable medium 3 to the reproduction-control unit 15 when a signal of indicating the clip reproduction is input through the operation unit 21.

At first, before the reproduction process, in step S30 of FIG. 16, the take-thumbnail generating unit 42 generates one thumbnail image of the take and then represents the thumbnail image on a display unit such as LCD on the output unit 23. The take-thumbnail generating unit 42 controls the MediaProfile-information-acquisition unit 43 or the take-information-acquisition unit 44, allowing it to obtain the information for reproducing a thumbnail image of the first scene of the recorded take among all clips constituting the corresponding take. Furthermore, the driver 27 is controlled based on the obtained information to read out the image data, the audio data, the low-res data recorded on the removable medium 3. The read-out data from the removable medium 3 is then supplied to the encoder/decoder unit 16. Subsequently, the take-thumbnail generating unit 42 reads out the information. That is, the information is for the reproducing one thumbnail image of the first scene of the registered take in MediaProfile obtained by the MediaProfile-information-acquisition unit 43. Subsequently, the thumbnail image is output to the display unit such as LCD. The user confirms the content of the material with one thumbnail image of the first scene of the take displayed on the display unit such as LCD. Then, the user operates the operation unit 21 to instruct the reproduction.

The take-reproducing unit 41 is being idle until the CPU 11 orders the start of take-reproduction. When it is determined that the CPU has indicated the start of take-reproduction, then the process proceeds to step S32. The take-reproducing unit 41 controls the take-information-acquisition unit 44. Thus, a clip-information file (for example clip-information file 71) constituting the added take-information file (for example, take-information file 91) is read out of the removable medium 3 through the drive 27. Subsequently, the take-information-acquisition unit 44 expands (loads) the clip-information file, which constitutes the take-information file being read out and added, in the RAM 13. Then, the process proceeds to step S33.

The take-reproducing unit 41 controls the take-information-acquisition unit 44 to obtain, the umid of the essence data reproduced, from the clip element constituting the added take-information file in the RAM 13. The umid may be, for example, "umid:060A2B340101010501010D43130000000000000 013360597080 046FFFF21D90E" on line 11 of FIG. 9 and "umid:060A2B340101010501010D43130000005A6900 0013360597080 046FFFF21D90E" on line 14 in FIG. 9. The take-reproducing unit 41 controls the MediaProfile-information-acquisition unit 43 to obtain clip elements. The clip elements may be, for example, the file names corresponding to the obtained umids (for example, "200709_0001_01.SMI" on line 37 and "200709_0001_02.SMI" on line 39), from <Component> of the MediaProfile in the RAM 13.

The take-reproducing unit 41 controls the drive 27, the encoder/decoder unit 16, and the output unit 23 based on the attribute information and the file name obtained by the take-information-acquisition unit 44 to reproduce the essence data recorded on the removable medium 3 to complete the take reproduction process. Specifically, under the control of the take-reproducing unit 41, the drive 27 reads the essence data corresponding to the file name out of the removable medium 3 and then supplies it to the encoder/decoder unit 16. The encoder/decoder unit 16 decodes the essence data based on the attribute information from the take-reproducing unit 41. The decoded data is then output to a monitor or a speaker, which constitutes the output unit 23.

As described above, after confirming the content of the material by one thumbnail image of the first scene of the take, which is required for the take-reproduction, the take-reproduction can be carried out. Therefore, the clip constituting the take can be reproduced from the clip-information file constituting the take-information file of MediaProfile.

It should be understood by those skilled in the art that various modifications, combinations, sub-combinations and alterations may occur depending on design requirements and other factors insofar as they are within the scope of the appended claims or the equivalents thereof.

What is claimed is:

1. A recording-and-reproducing apparatus for reproducibly controlling data recorded on a recording medium, comprising:
   means for acquiring control information required for reproducing the data when the data is recorded;
   means for controlling operations during a period from the start to the end of recording data on the recording medium;
   means for determining whether a recorded file of the data exceeds a predetermined limit of a storage capacity of a file system in the recoding medium and sequentially generating a subsequent recorded file upon exceeding the limit;

means for generating a single recording-and-reproducing unit during the period from the start to the end of recording data on the recording medium indicated by the control means based on a plurality of recorded files, which are sequentially generated by the determining and generating means upon exceeding the limit; and means for updating the control information by recording the single recording-and-reproducing unit generated by the recording-and-reproducing unit generation means on the control information by adding to the control information locations of a take-info file, a not-real-time metadata file, and one or more clip information files for controlling clips included in the single recording-and-reproducing unit.

2. A recording-and-reproducing apparatus according to claim 1, wherein the single recording-and-reproducing unit generated by the recording-and-reproducing unit generation means is independently defined, having the same folder configuration as that of editing information for the plurality of recorded files.

3. A recording-and-reproducing apparatus according to claim 1, wherein the single recording-and-reproducing unit generated by the recording-and-reproducing unit generation means is independently defined by a namespace, which is different from a namespace of the editing information for the plurality of recoded files.

4. A recording-and-reproducing apparatus according to claim 1, wherein when the control information is updated by the update means, the single recording-and-reproducing unit is added to the control information in conjunction with the plurality of recoded files that constitute the single recording-and-reproducing unit.

5. A recording-and-reproducing apparatus according to claim 4, wherein when the single recording-and-reproducing unit is reproduced, a single thumbnail image of the single recording-and-reproducing unit is displayed; and when the reproduction of the single recording-and-reproducing unit is indicated, the plurality of recorded files that constitute the single recording-and-reproducing unit, which is recorded on the control information, is reproduced.

6. A recording-and-reproducing method for reproducibly controlling data recorded on a recording medium, comprising the steps of:

acquiring control information required for reproducing the data when the data is recorded;

controlling operations during a period from the start to the end of recording data on the recording medium;

determining whether a recorded file of the data exceeds a predetermined limit of a storage capacity of a file system in the recoding medium and sequentially generating a subsequent recorded file upon exceeding the limit;

generating a single recording-and-reproducing unit during the period from the start to the end of recording data on the recording medium controlled by the control step based on a plurality of recorded files, which are sequentially generated by the determination and generation step upon exceeding the limit; and updating the control information by recording the single recording-and-reproducing unit generated by the recording-and-reproducing unit generation step on the control information by adding to the control information locations of a take-info file, a not-real-time metadata file, and one or more clip information files for controlling clips included in the single recording-and-reproducing unit.

7. A recording-and-reproducing apparatus for reproducibly controlling data recorded on a recording medium, comprising:

a device configured to acquire control information required for reproducing the data when the data is recorded;

a device configured to control operations during a period from the start to the end of recording data on the recording medium;

a device configured to determine whether a recorded file of the data exceeds a predetermined limit of a storage capacity of a file system in the recoding medium and sequentially generate a subsequent recorded file upon exceeding the limit;

a device configured to generate a single recording-and-reproducing unit during the period from the start to the end of recording data on the recording medium indicated by the control device based on a plurality of recorded files, which are sequentially generated by the determination and generation device upon exceeding the limit; and a device for updating the control information by recording the single recording-and-reproducing unit generated by the recording-and-reproducing unit generation device on the control information by adding to the control information locations of a take-info file, a not-real-time metadata file, and one or more clip information files for controlling clips included in the single recording-and-reproducing unit.

* * * * *